(12) United States Patent
Gathala et al.

(10) Patent No.: US 9,189,624 B2
(45) Date of Patent: Nov. 17, 2015

(54) ADAPTIVE OBSERVATION OF BEHAVIORAL FEATURES ON A HETEROGENEOUS PLATFORM

(71) Applicant: QUALCOMM Incorporated, San Diego, CA (US)

(72) Inventors: Anil Gathala, Santa Clara, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/268,547

(22) Filed: May 2, 2014

(65) Prior Publication Data

US 2014/0245306 A1 Aug. 28, 2014

Related U.S. Application Data

(63) Continuation of application No. 13/773,877, filed on Feb. 22, 2013.

(60) Provisional application No. 61/646,590, filed on May 14, 2012, provisional application No. 61/683,274, filed on Aug. 15, 2012.

(51) Int. Cl.
*G06F 21/00* (2013.01)
*G06F 21/55* (2013.01)
(Continued)

(52) U.S. Cl.
CPC .......... *G06F 21/552* (2013.01); *G06F 11/1433* (2013.01); *G06F 11/1458* (2013.01);
(Continued)

(58) Field of Classification Search
CPC ....... G06F 21/55; G06F 21/554; G06F 21/56; G06F 21/64; G06F 21/552; G06F 21/50; H04W 12/12

USPC .................................................... 726/22–25
See application file for complete search history.

(56) References Cited

U.S. PATENT DOCUMENTS 5,870,735 A 2/1999 Agrawal et al.
6,532,541 B1 3/2003 Chang et al.
(Continued)

FOREIGN PATENT DOCUMENTS

CN 102591696 A 7/2012
EP 1182552 A2 2/2002
(Continued)

OTHER PUBLICATIONS

Oleg Kacirski et al, "Effective Intrusion Detectiion Using Windows Ad Hoc Networks", Proceedings of the 36th Hawaii International Conference on System Sciences, 2002. IEEE. 8 pages.*
(Continued)

*Primary Examiner* — Hadi Armouche
*Assistant Examiner* — Sher A Khan
(74) *Attorney, Agent, or Firm* — Won Tae C. Kim

(57) ABSTRACT

Methods, devices and systems for monitoring behaviors of a mobile computing device include observing in a non-master processing core a portion of a mobile device behavior that is relevant to the non-master processing core, generating a behavior signature that describes the observed portion of the mobile device behavior, and sending the generated behavior signature to a master processing core. The master processing core combines two or more behavior signatures received from the non-master processing cores to generate a global behavior vector, which may be used by an analyzer module to determine whether a distributed software application is not benign.

16 Claims, 13 Drawing Sheets

(51) Int. Cl.
  *G06F 21/56* (2013.01)
  *G06F 11/14* (2006.01)
  *G06F 11/30* (2006.01)
  *H04W 52/02* (2009.01)
  *H04W 24/08* (2009.01)
  *G06F 11/34* (2006.01)
  *H04W 12/12* (2009.01)
  *H04W 88/02* (2009.01)
  *H04L 29/06* (2006.01)

(52) U.S. Cl.
  CPC ........ *G06F11/3006* (2013.01); *G06F 11/3082* (2013.01); *G06F 11/3466* (2013.01); *G06F 21/554* (2013.01); *G06F 21/56* (2013.01); *H04W 24/08* (2013.01); *H04W 52/0251* (2013.01); *H04W 52/0258* (2013.01); *G06F 11/3409* (2013.01); *G06F 11/3476* (2013.01); *G06F 2201/86* (2013.01); *H04L 63/1433* (2013.01); *H04W 12/12* (2013.01); *H04W 88/02* (2013.01); *Y02B 60/165* (2013.01)

(56) References Cited

U.S. PATENT DOCUMENTS

| | | |
|---|---|---|
| 6,643,802 B1 | 11/2003 | Frost et al. |
| 7,051,327 B1 | 5/2006 | Milius et al. |
| 7,401,359 B2 | 7/2008 | Gartside et al. |
| 7,559,053 B2 | 7/2009 | Krassovsky et al. |
| 7,561,877 B2 | 7/2009 | Cassett et al. |
| 7,571,478 B2 | 8/2009 | Munson et al. |
| 7,600,014 B2 | 10/2009 | Russell et al. |
| 7,650,317 B2 | 1/2010 | Basu et al. |
| 7,676,573 B2 | 3/2010 | Herzog et al. |
| 7,694,150 B1 | 4/2010 | Kirby |
| 7,757,292 B1 | 7/2010 | Renert et al. |
| 7,774,599 B2 | 8/2010 | Guo et al. |
| 7,831,237 B2 | 11/2010 | Passarella et al. |
| 7,831,248 B2 | 11/2010 | Lee |
| 7,849,360 B2 | 12/2010 | Largman et al. |
| 7,877,621 B2 | 1/2011 | Jacoby et al. |
| 7,881,291 B2 | 2/2011 | Grah |
| 7,890,443 B2 | 2/2011 | Zhang et al. |
| 7,945,955 B2 | 5/2011 | Katkar |
| 8,045,958 B2 | 10/2011 | Kahandaliyanage |
| 8,087,067 B2 | 12/2011 | Mahaffey et al. |
| 8,095,964 B1 | 1/2012 | Zhong et al. |
| 8,161,548 B1 | 4/2012 | Wan |
| 8,201,244 B2 | 6/2012 | Sun et al. |
| 8,201,249 B2 | 6/2012 | Mccallam |
| 8,225,093 B2 | 7/2012 | Fok et al. |
| 8,245,295 B2 | 8/2012 | Park et al. |
| 8,245,315 B2 | 8/2012 | Cassett et al. |
| 8,266,698 B1 | 9/2012 | Seshardi et al. |
| 8,311,956 B2 | 11/2012 | Sen et al. |
| 8,312,545 B2 | 11/2012 | Tuvell et al. |
| 8,321,941 B2 | 11/2012 | Tuvell et al. |
| 8,331,987 B2 | 12/2012 | Rosenblatt |
| 8,332,945 B2 | 12/2012 | Kim et al. |
| 8,347,386 B2 | 1/2013 | Mahaffey et al. |
| 8,397,301 B2 | 3/2013 | Hering et al. |
| 8,443,439 B2 | 5/2013 | Lamastra et al. |
| 8,458,809 B2 | 6/2013 | Adams et al. |
| 8,516,584 B2 | 8/2013 | Moskovitch et al. |
| 8,533,844 B2 | 9/2013 | Mahaffey et al. |
| 8,554,912 B1 | 10/2013 | Reeves et al. |
| 8,694,744 B1 | 4/2014 | Raj et al. |
| 8,701,192 B1* | 4/2014 | Glick et al. ............... 726/24 |
| 8,762,298 B1 | 6/2014 | Ranjan et al. |
| 8,763,127 B2 | 6/2014 | Yao et al. |
| 8,775,333 B1 | 7/2014 | Zahn |
| 2002/0099756 A1* | 7/2002 | Catthoor et al. ........... 709/102 |
| 2004/0039924 A1 | 2/2004 | Baldwin et al. |
| 2004/0068721 A1 | 4/2004 | O'Neill et al. |
| 2004/0083366 A1 | 4/2004 | Nachenberg et al. |
| 2004/0221163 A1 | 11/2004 | Jorgensen et al. |
| 2005/0144480 A1 | 6/2005 | Kim et al. |
| 2006/0026464 A1* | 2/2006 | Atkin et al. ............... 714/38 |
| 2006/0085854 A1 | 4/2006 | Agrawal et al. |
| 2006/0288209 A1 | 12/2006 | Vogler |
| 2007/0006304 A1 | 1/2007 | Kramer et al. |
| 2007/0136455 A1 | 6/2007 | Lee et al. |
| 2007/0192866 A1 | 8/2007 | Sagoo et al. |
| 2007/0199060 A1 | 8/2007 | Touboul |
| 2007/0220327 A1 | 9/2007 | Ruscio et al. |
| 2007/0283170 A1 | 12/2007 | Yami et al. |
| 2007/0287387 A1 | 12/2007 | Keum et al. |
| 2007/0294768 A1 | 12/2007 | Moskovitch et al. |
| 2008/0016339 A1 | 1/2008 | Shukla |
| 2008/0026464 A1 | 1/2008 | Borenstein et al. |
| 2008/0046755 A1 | 2/2008 | Hayes |
| 2008/0047009 A1 | 2/2008 | Overcash et al. |
| 2008/0086773 A1 | 4/2008 | Tuvell et al. |
| 2008/0109495 A1 | 5/2008 | Herberger et al. |
| 2008/0140821 A1* | 6/2008 | Tada ............................ 709/223 |
| 2008/0162686 A1 | 7/2008 | Kalaboukis et al. |
| 2008/0163382 A1* | 7/2008 | Blue et al. ................... 726/28 |
| 2008/0172746 A1 | 7/2008 | Lotter et al. |
| 2009/0019546 A1 | 1/2009 | Park et al. |
| 2009/0199296 A1 | 8/2009 | Xie et al. |
| 2009/0217078 A1 | 8/2009 | Cassett et al. |
| 2009/0239531 A1 | 9/2009 | Andreasen et al. |
| 2009/0287618 A1 | 11/2009 | Weinberger et al. |
| 2009/0288080 A1 | 11/2009 | Partridge |
| 2009/0288164 A1 | 11/2009 | Adelstein et al. |
| 2009/0300765 A1 | 12/2009 | Moskovitch et al. |
| 2009/0327168 A1 | 12/2009 | Weinberger et al. |
| 2010/0011029 A1 | 1/2010 | Niemelae |
| 2010/0036786 A1 | 2/2010 | Pujara |
| 2010/0082513 A1 | 4/2010 | Liu |
| 2010/0105404 A1 | 4/2010 | Palanki et al. |
| 2010/0107257 A1 | 4/2010 | Ollmann |
| 2010/0128125 A1 | 5/2010 | Warzelhan |
| 2010/0153371 A1 | 6/2010 | Singh |
| 2010/0154032 A1 | 6/2010 | Ollmann |
| 2010/0175135 A1* | 7/2010 | Kandek et al. ............... 726/25 |
| 2010/0192201 A1 | 7/2010 | Shimoni et al. |
| 2010/0241974 A1 | 9/2010 | Rubin et al. |
| 2010/0251340 A1 | 9/2010 | Martin et al. |
| 2010/0262693 A1 | 10/2010 | Stokes et al. |
| 2010/0296496 A1 | 11/2010 | Sinha et al. |
| 2010/0299292 A1 | 11/2010 | Collazo |
| 2010/0313269 A1 | 12/2010 | Ye |
| 2011/0004935 A1 | 1/2011 | Moffie et al. |
| 2011/0013528 A1 | 1/2011 | Chen |
| 2011/0023118 A1 | 1/2011 | Wright |
| 2011/0060948 A1 | 3/2011 | Beebe |
| 2011/0105096 A1 | 5/2011 | Dods et al. |
| 2011/0145920 A1 | 6/2011 | Mahaffey et al. |
| 2011/0161452 A1 | 6/2011 | Poornachandran et al. |
| 2011/0219449 A1 | 9/2011 | St. Neitzel et al. |
| 2011/0264764 A1 | 10/2011 | Kewalramani et al. |
| 2011/0286437 A1 | 11/2011 | Austin et al. |
| 2011/0302654 A1 | 12/2011 | Miettinen |
| 2011/0302656 A1 | 12/2011 | El-Moussa |
| 2011/0307233 A1 | 12/2011 | Tseng et al. |
| 2012/0016633 A1 | 1/2012 | Wittenstein et al. |
| 2012/0051228 A1 | 3/2012 | Shuman et al. |
| 2012/0060219 A1 | 3/2012 | Larsson et al. |
| 2012/0096539 A1 | 4/2012 | Hu et al. |
| 2012/0110174 A1 | 5/2012 | Wootton et al. |
| 2012/0131674 A1* | 5/2012 | Wittenschlaeger ........... 726/23 |
| 2012/0151062 A1 | 6/2012 | Gusev et al. |
| 2012/0159633 A1 | 6/2012 | Grachev et al. |
| 2012/0167162 A1 | 6/2012 | Raleigh et al. |
| 2012/0167217 A1 | 6/2012 | Mcreynolds |
| 2012/0167218 A1 | 6/2012 | Poornachandran et al. |
| 2012/0180126 A1 | 7/2012 | Liu et al. |
| 2012/0207046 A1 | 8/2012 | Di Pietro et al. |
| 2012/0210423 A1 | 8/2012 | Friedrichs et al. |
| 2012/0227105 A1 | 9/2012 | Friedrichs et al. |
| 2012/0233694 A1 | 9/2012 | Baliga et al. |
| 2012/0254333 A1 | 10/2012 | Chandramouli et al. |

(56) References Cited

U.S. PATENT DOCUMENTS

| | | |
|---|---|---|
| 2012/0270611 A1 | 10/2012 | Choi et al. |
| 2012/0311366 A1 | 12/2012 | Alsina et al. |
| 2012/0311708 A1 | 12/2012 | Agarwal et al. |
| 2012/0317306 A1 | 12/2012 | Radinsky et al. |
| 2012/0321175 A1 | 12/2012 | Hedau et al. |
| 2012/0323853 A1 | 12/2012 | Fries et al. |
| 2013/0014262 A1 | 1/2013 | Lee et al. |
| 2013/0031600 A1 | 1/2013 | Luna et al. |
| 2013/0066815 A1 | 3/2013 | Oka et al. |
| 2013/0097706 A1 | 4/2013 | Titonis et al. |
| 2013/0151848 A1 | 6/2013 | Baumann et al. |
| 2013/0167231 A1 | 6/2013 | Raman et al. |
| 2013/0179991 A1 | 7/2013 | White et al. |
| 2013/0203440 A1 | 8/2013 | Bilange et al. |
| 2013/0204812 A1 | 8/2013 | Sterzing et al. |
| 2013/0247187 A1 | 9/2013 | Hsiao et al. |
| 2013/0267201 A1 | 10/2013 | Gupta et al. |
| 2013/0303154 A1 | 11/2013 | Gupta et al. |
| 2013/0303159 A1 | 11/2013 | Gathala et al. |
| 2013/0304676 A1 | 11/2013 | Gupta et al. |
| 2013/0304677 A1 | 11/2013 | Gupta et al. |
| 2013/0304869 A1 | 11/2013 | Gupta et al. |
| 2013/0305101 A1 | 11/2013 | Gupta et al. |
| 2013/0305358 A1 | 11/2013 | Gathala et al. |
| 2013/0305359 A1 | 11/2013 | Gathala et al. |
| 2014/0007183 A1 | 1/2014 | Qureshi et al. |
| 2014/0051432 A1 | 2/2014 | Gupta et al. |
| 2014/0053260 A1 | 2/2014 | Gupta et al. |
| 2014/0053261 A1 | 2/2014 | Gupta et al. |
| 2014/0096246 A1 | 4/2014 | Morrissey et al. |
| 2014/0150100 A1 | 5/2014 | Gupta et al. |
| 2014/0187177 A1 | 7/2014 | Sridhara et al. |
| 2014/0188781 A1 | 7/2014 | Fawaz |
| 2014/0205099 A1 | 7/2014 | Christodorescu et al. |
| 2014/0237595 A1 | 8/2014 | Sridhara et al. |
| 2014/0279745 A1 | 9/2014 | Esponda et al. |
| 2014/0317734 A1 | 10/2014 | Valencia et al. |
| 2014/0337862 A1 | 11/2014 | Valencia et al. |
| 2015/0148109 A1 | 5/2015 | Gupta et al. |

FOREIGN PATENT DOCUMENTS

| | | |
|---|---|---|
| EP | 1983686 A1 | 10/2008 |
| EP | 2182458 A1 | 5/2010 |
| EP | 2326057 A1 | 5/2011 |
| EP | 2406717 A1 | 1/2012 |
| EP | 2680182 A1 | 1/2014 |
| TW | 200937198 A | 9/2009 |
| TW | 201239618 A | 10/2012 |
| WO | WO-2010048502 | 4/2010 |
| WO | WO-2010126416 A1 | 11/2010 |
| WO | WO-2011147580 A1 | 12/2011 |
| WO | WO-2013016692 | 1/2013 |
| WO | WO-2013080096 A1 | 6/2013 |
| WO | WO-2013172865 A1 | 11/2013 |
| WO | WO-2013173003 A2 | 11/2013 |
| WO | WO-2013173044 A2 | 11/2013 |

OTHER PUBLICATIONS

Caruana, et al., "An Empirical Comparison of Supervised Learning Algorithms", ICML, 2006, 8 pgs.

Caruana, et al., "An Empirical Evaluation of Supervised Learning in High Dimensions", ICML, 2008, 8 pgs.

Co-pending U.S. Appl. No. 13/558,527, filed Jul. 26, 2012.

Hu W., et al., "AdaBoost-Based Algorithm for Network Intrusion Detection," IEEE Transactions on Systems, Man, and Cybernetics, Part B: Cybernetics, Apr. 2008, vol. 38 (2), pp. 577-583.

International Search Report and Written Opinion—PCT/US2012/067726—ISA/EPO—Mar. 14, 2013.

International Search Report and Written Opinion—PCT/US2013/023246—ISA/EPO—Jul. 16, 2013.

International Search Report and Written Opinion—PCT/US2013/023646—ISA/EPO—Jul. 16, 2013.

International Search Report and Written Opinion—PCT/US2013/035943—ISA/EPO—Nov. 7, 2013.

International Search Report and Written Opinion—PCT/US2013/035952—ISA/EPO—Jul. 30, 2013.

Lu Y. B., et al., "Using Multi-Feature and Classifier Ensembles to Improve Malware Detection", Journal of Chung Cheng Institute of Technology, vol. 39, No. 2, Nov. 2010, pp. 57-72, XP55086345, ISSN: 0255-6030.

Natesan P. et al., "Design of Two Stage Filter Using Enhanced Adaboost for Improving Attack Detection Rates in Network Intrusion Detection", International Journal of Computer Science and Information Technology & Security, vol. 2, No. 2, Apr. 2012, pp. 349-358, XP55086347, ISSN: 2249-955.

Qin F., "System Support for Improving Software Dependability During Production Runs," Urbana, Illinois, 1998, pp. 1-116.

Shabtai A., et al., "a Andromalya: a behavioral malware detection framework for android devices", Journal of Intelligent Information Systems, Kluwer Academic Publishers, BO, vol. 38, No. 1, Jan. 6, 2011, pp. 161-190, XP019998836, ISSN: 1573-7675, DOI: 10.1007/S10844-010-0148-X paragraph [5.3.1] -paragraph [5.3.4].

Shabtai A., et al., "Dectecting unknown malicious code by applying classification techniques on OpCode patterns," Security Informatics a Springer Open Journal, 2012, vol. 1 (1), pp. 1-22.

Shabtai A., "Malware Detection on Mobile Devices," Eleventh International Conference on Mobile Data Management, IEEE Computer Society, 2010, pp. 289-290.

Sheen S., et al., "Network Intrusion Detection using Feature Selection and Decision tree classifier," TENCON—IEEE Region 10 Conference, 2008, pp. 1-4.

Wang Y-M., et al., "Strider: A Black-Box, State-based Approach to Change and Configuration Management and Support," 2003 LISA XVII—Oct. 26-31, 2003—San Diego, CA, pp. 165-178.

Abu-Nimeh S., "Phishing detection using distributed Bayesian additive regression trees", Dec. 13, 2008, Southern Methodist University, 28 pages, XP055107295, ISBN: 9780549908630 chapters 2, 4, 6 and 8.

Chekina L., et al., "Detection of deviations in mobile applications network behavior", arXiv:1208.0564v2, Aug. 5, 2012, 5 pages, XP055107301, Retrieved from the Internet: URL: http://arxiv.org/abs/1208.0564v2 [retrieved on Nov. 1, 2013] the whole document.

Folino G., et al., "An ensemble-based evolutionary framework for coping with distributed intrusion detection", Genetic Programming and Evolvable Machines, vol. 11, No. 2 Feb. 7, 2010, pp. 131-146, XP019789345, DOI: 10.1007/S10710-010-9101-6 the whole document.

Gao J., et al., "Adaptive distributed intrusion detection using parametric model", Proceeding of the 2009 IEEE/WIC/ACM International Joint Conference on Web Intelligence and Intelligent Agent Technologies (WI-IAT'09), vol. 1, Sep. 15, 2009, pp. 675-678, XP055107983, DOI: 10.1109/WI-IAT.2009.113 the whole document.

Jean E., et al., "Boosting-based distributed and adaptive security-monitoring through agent collaboration", Proceedings of the 2007 IEEE/WIC/ACM International Conferences on Web Intelligence and Intelligent Agent Technology Workshops (WI-IATW'07), Nov. 5, 2007, pp. 516/520, XP031200055, DOI: 10.1109/WI-IATW.2007.52 the whole document.

Miluzzo E., et al., "Vision: mClouds—computing on clouds of mobile devices", Proceedings of the 3rd ACM Workshop on Mobile Cloud Computing and Services (MCS'12), Jun. 25, 2012, pp. 9-14, XP055107956, DOI: 10.1145/2307849.2307854 the whole document.

Schmidt A.D., et al., "Static analysis of executables for collaborative malware detection on android", Proceedings of the 2009 IEEE International Conference on Communications (ICC'09), Jun. 14, 2009, 3 pages, XP031506460, DOI: 10.1109/ICC.209.5199486 the whole document.

Shamili A.S., et al., "Malware detection on mobile devices using distributed machine learning", Proceedings of the 20th International Conference of Pattern Recognition (ICPR'10), Aug. 23, 2010, pp. 4348-4351, XP031772702, DOI: 10.1109/ICPR.2010.1057 the whole document.

(56) References Cited

OTHER PUBLICATIONS

Tabish S.M., "Malware detection using statistical analysis of byte-level file content", Proceedings of the ACM SIGKDD Workshop on Cybersecurity and Intillegence Informatics (CSI-KDD'09), Jun. 28, 2009, pp. 23-31, XP055107225, DOI: 10.1145/1599272.1599278 the whole document.
Kirda E., et al., "Behavior-Based Spyware Detection", 15th Usenix Security Symposium, 2002, pp. 273-288.
De Stefano C., et al., "Pruning GP-Based Classifier Ensembles by Bayesian Networks," Lecture Notes in Computer Science, Sep. 1, 2012, pp. 236-245, XP047016355, DOI: 10.1007/978-3-642-32937-1_24, Sections 1 and 2.
International Search Report and Written Opinion—PCT/US2013/078350—ISA/EPO—Oct. 29, 2014.
Saller K., et al., "Reducing Feature Models to Improve Runtime Adaptivity on Resource Limited Devices," Proceedings of the 16th International Software Product Line Conference (SPLC), Sep. 2, 2012, vol. 11, pp. 135-142, XP058009814, DOI: 10.1145/2364412.2364435, Section 5.
Kolter J.Z., et al., "Learning to Detect Malicious Executables in the Wild", ACM Know!. Discovery and Data Mining (KDD), 2004, pp. 470-478.
Gavin McWilliams: "Malware detection methods for fixed and mobile networks", Centre for Secure Information Technologies—Queen'S University Belfast, Jan. 23, 2013, pp. 1-21, XP017577639, [retrieved on Jan. 23, 2013] the whole document.
Jarle Kittilsen: "Detecting malicious PDF documents", Dec. 1, 2011, pp. 1-112, XP055947997, Gjovik, Norway Retrieved from the Internet: URL:http:f/brage.bibsys.no/hig/retrieve/21 28/Jarle Kittilsen.pdf [retrieved on Dec. 14, 2012] the whole document.
Yerima.S.Y. et al., "A New Android Malware Detection Approach Using Bayesian Classification", 2014 IEEE 28th International Conference on advanced Information Networking and Applications, IEEE, Mar. 25, 2013, pp. 121-128, XP032678454, ISSN: 1550-445X, DOI: 10.1109/AINA.2013.88 ISBN: 978-1-4673-5550-6 [retrived on Jun. 16, 2013] the whole document.
Burguera I., et al., "Crowdroid", Security and Privacy in Smartphones and Mobile Devices, ACM, 2 Penn Plaza, Suite 701 New York NY 10121-0701 USA, Oct. 17, 2011, XP058005976, DOI: 10.1145/2046614.2046619 ISBN: 978-1-4503-1000-0, pp. 15-26.
Schmidt A.D., et al., "Monitoring Smartphones for Anomaly Detection", Mobile Networks and Applications, vol. 14, No. 1, Feb. 1, 2009, pp. 92-106, XP055115882, ISSN: 1383-469X, DOI:10.1007/s11036-008-0113-x.
Kaspersky Endpoint Security 8 for Smartphone Program Version 8.0, Updated on Feb. 8, 2012.

* cited by examiner

ADAPTIVE OBSERVATION OF BEHAVIORAL FEATURES ON A HETEROGENEOUS PLATFORM

RELATED APPLICATIONS

This application is a continuation of U.S. patent application Ser. No. 13/773,877 entitled "Adaptive Observation of Behavioral Features on a Heterogeneous Platform" filed Feb. 22, 2013, which claims the benefit of priority to U.S. Provisional Patent Application No. 61/646,590 entitled "System, Apparatus and Method for Adaptive Observation of Mobile Device Behavior" filed May 14, 2012; and U.S. Provisional Application No. 61/683,274, entitled "System, Apparatus and Method for Adaptive Observation of Mobile Device Behavior" filed Aug. 15, 2012, the entire contents of all which are hereby incorporated by reference for all purposes.

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever, and now commonly include multiple processors, system-on-chips (SoCs), and other resources that allow mobile device users to execute complex and power intensive software applications (e.g., video streaming, video processing, etc.) on their mobile devices. This complexity has created new opportunities for malicious software, software conflicts, hardware faults, and other similar errors or phenomena to negatively impact a mobile device's long-term and continued performance and power utilization levels. Accordingly, new and improved solutions for identifying and correcting conditions and/or mobile device behaviors that may negatively impact the mobile device's long term and continued performance and power utilization levels will be beneficial to consumers.

SUMMARY

The various aspects include a method of monitoring behaviors of a mobile computing device by observing in a non-master processing core a portion of a mobile device behavior that is relevant to the non-master processing core, generating in the non-master processing core a behavior signature that describes the observed portion of the mobile device behavior, sending the generated behavior signature to a master processing core, combining two or more behavior signatures received from non-master processing cores in the master processing core to generate a global behavior vector, and providing the global behavior vector to an analyzer module for processing.

In an aspect, processing by the analyzer module may include determining whether a software application is benign or not benign based on the generated behavior vector. In a further aspect, the method may include generating a task graph in the master core, and combining two or more behavior signatures in the master processing core to generate a global behavior vector may include combining the two or more behavior signatures based on the generated task graph. In a further aspect, the method may include monitoring in the master processing core a distribution of sub-tasks of a single application to one or more non-master cores. In a further aspect, monitoring the distribution of sub-tasks may include monitoring calls to a transport layer of the mobile device.

Further aspects may include a computing device having a memory, a master processor and one or more non-master processors coupled to the memory. Each of the one or more non-master processors may be configured with processor-executable instructions to perform operations that may include observing in a non-master processing core a portion of a mobile device behavior that is relevant to the non-master processing core, generating in the non-master processing core a behavior signature that describes the observed portion of the mobile device behavior, and sending the generated behavior signature to a master processor. The master processor may be configured with processor-executable instructions to perform operations that may include combining two or more behavior signatures received from non-master processing cores in the master processing core to generate a global behavior vector, and providing the global behavior vector to an analyzer module for processing.

In an aspect, the master processor may be configured with processor-executable instructions to perform operations that further include determining whether a software application is benign or not benign based on the generated behavior vector in the analyzer module. In a further aspect, the master processor may be configured with processor-executable instructions to perform operations further including generating a task graph, and the master processor may be configured with processor-executable instructions such that combining two or more behavior signatures to generate a global behavior vector may include combining the two or more behavior signatures based on the generated task graph.

In a further aspect, the master processor may be configured with processor-executable instructions to perform operations that further include monitoring a distribution of sub-tasks of a single application to the non-master processors. In a further aspect, the master processor may be configured with processor-executable instructions such that monitoring the distribution of sub-tasks may include monitoring calls to a transport layer of the mobile device.

Further aspects may include a computing device having multiple heterogeneous cores, and means for observing in a non-master processing core a portion of a mobile device behavior that is relevant to the non-master processing core, means for generating in the non-master processing core a behavior signature that describes the observed portion of the mobile device behavior, means for sending the generated behavior signature to a master processing core, means for combining two or more behavior signatures received from non-master processing cores in the master processing core to generate a global behavior vector, and means for providing the global behavior vector to an analyzer module for processing. In an aspect, means for determining in the analyzer module whether a software application is benign or not benign based on the generated behavior vector.

In a further aspect, the computing device may include means for generating a task graph in the master core, and means for combining two or more behavior signatures in the master processing core to generate a global behavior vector may include means for combining the two or more behavior signatures based on the generated task graph. In a further aspect, the computing device may include means for monitoring in the master processing core a distribution of sub-tasks of a single application to one or more non-master cores. In a further aspect, means for monitoring the distribution of sub-tasks may include means for monitoring calls to a transport layer of the mobile device Further aspects include a non-transitory server-readable storage medium having stored thereon processor-executable instructions configured cause a heterogeneous multiprocessor system (e.g., of mobile computing device) to perform various operations, including observing in a non-master processing core a portion of a mobile device behavior that is relevant to the non-master processing core, generating in the non-master processing core a behavior signature that describes the observed portion of the mobile device behavior, sending the generated behavior signature to a master processing core, combining two or more behavior signatures received from non-master processing cores in the master processing core to generate a global behavior vector, and providing the global behavior vector to an analyzer module for processing. In an aspect, the stored processor-executable software instructions may be configured to cause a processor to perform operations further including processing the global behavior vector by the analyzer module to determine whether a software application is benign or not benign based on the generated behavior vector.

In a further aspect, the stored processor-executable software instructions may be configured to cause a processor to perform operations including generating a task graph in the master core, and wherein the stored processor-executable software instructions may be configured to cause a processor to perform operations such that combining two or more behavior signatures in the master processing core to generate a global behavior vector may include combining the two or more behavior signatures based on the generated task graph. In a further aspect, the stored processor-executable software instructions may be configured to cause a processor to perform operations including monitoring in the master processing core a distribution of sub-tasks of a single application to one or more non-master cores. In a further aspect, the stored processor-executable software instructions may be configured to cause a processor to perform operations such that monitoring the distribution of sub-tasks may include monitoring calls to a transport layer of the mobile device

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
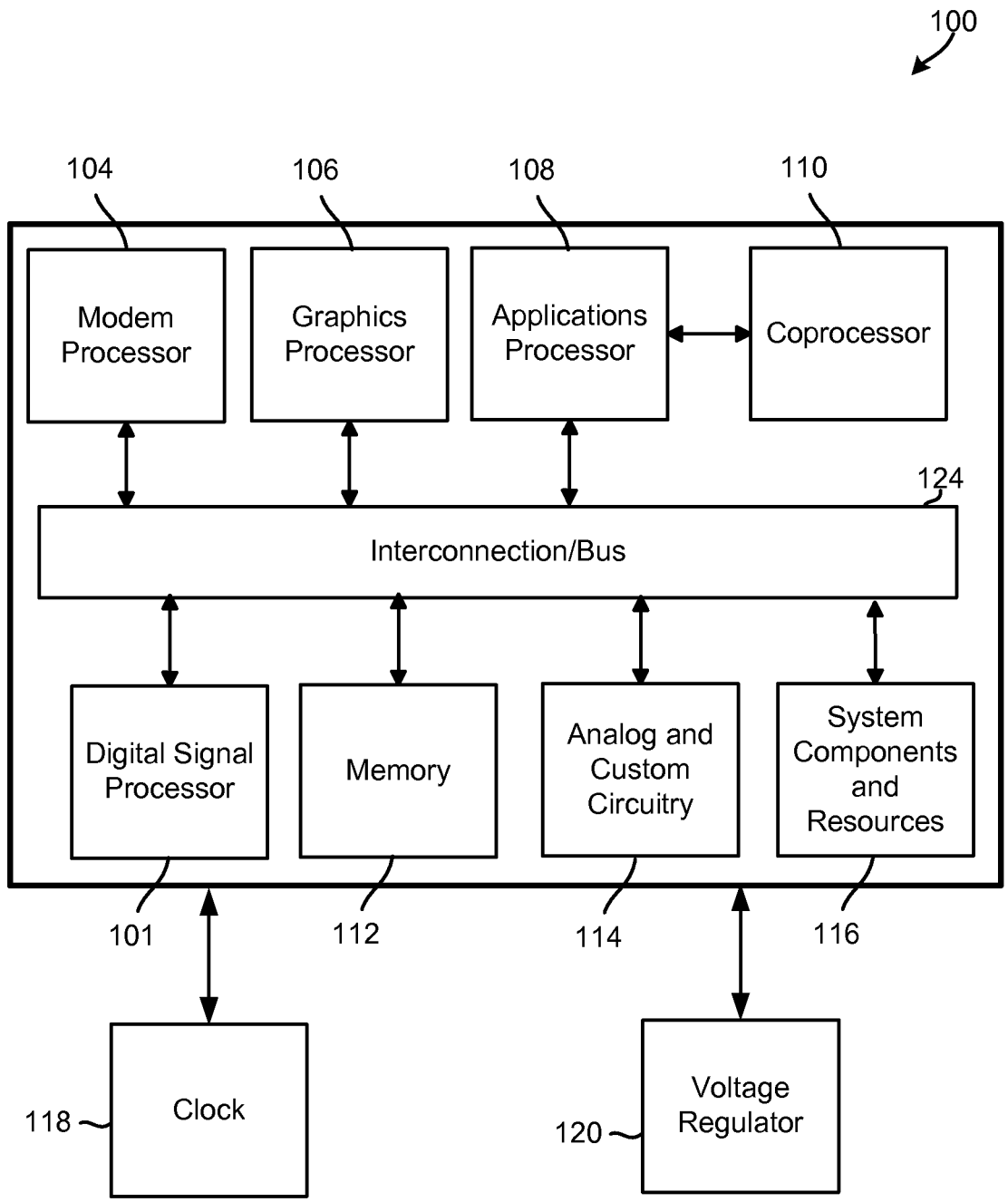
FIG. 1 is an architectural diagram of an example system on chip suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices, such as smartphones, which have limited processing power and battery life, the aspects are generally useful in any computing device that includes multiple heterogeneous processors/cores suitable for executing application programs.

In overview, the various aspects include methods, as well as multiprocessor computing systems configured to execute the methods, for performing behavior detection and analysis operations in a mobile device having multiple distributed or heterogeneous computational units (e.g., processors, cores, etc.) to efficiently identify, prevent, and/or correct the conditions and mobile device behaviors that have a high potential to contribute to the degradation in performance and power utilization levels of the mobile device over time. The behavior analysis operations may include identifying the overall behavior of a single software application whose operations are distributed across a plurality of heterogeneous cores. This may be achieved by observing or monitoring a partial mobile device behavior in each of the plurality of heterogeneous cores and using a task graph to recombine the observed partial mobile device behaviors in a main processor/core (e.g., CPU, applications processor, etc.) to generate a behavior vector suitable for use in determining whether the overall behavior of the software application or mobile device is consistent with normal operating patterns of that mobile device. A partial mobile device behavior may be a portion of a mobile device behavior that is relevant to the monitoring core, such as the portions that have access to the same memory and processing resources as the processing core, portions that are executed by the processing core, portions that invoke functions/operations on the processing core, etc.

The term "system on chip" (SOC) is used herein to refer to a single integrated circuit (IC) chip that contains multiple resources, computational units, processors and/or cores integrated on a single substrate. A single SOC may contain circuitry for digital, analog, mixed-signal, and radio-frequency functions, as well as any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) is used herein to refer to a single module or package that contains multiple resources, computational units, cores and/or processors on two or more IC chips or substrates. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile computing device. The proximity of the SOCs facilitates high speed communications and the sharing of memory and resources, as well as for more coordinated cooperation and synchronization between the components in the SOCs.

The terms "multiprocessor" and "multiprocessor computing system" are used herein to refer to a system or device that includes two or more computational or processing units configured to read and execute program instructions. The term "multicore processor" is used herein to refer to a single integrated circuit (IC) chip or chip package that contains two or more independent computational or processing units (e.g., CPU cores, IP cores, etc.) configured to read and execute program instructions. A SOC may include multiple multicore processors, and each processor in an SOC may be referred to as a core.

The term "context information" is used herein to refer to any information available to a thread or process running in a host operating system (e.g., Android, Windows 8, LINUX, etc.), and may include operational state data and permissions and/or access restrictions that identify the operating system services, libraries, file systems, and other resources that the thread/process may access. Such operational state data may include the process's address space, stack space, virtual address space, register set image (e.g. program counter, stack pointer, instruction register, program status word, etc.), accounting information, permissions, access restrictions, and state information.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the mobile device behaviors that may contribute to that mobile device's performance degradation over time.

Various other solutions exist for modeling the behavior of processes or application programs executing on a computing device, and such behavior models may be used to differentiate between malicious and benign process/programs on computing devices. However, these existing modeling solutions are not suitable for use on mobile devices because such solutions generally require the execution of computationally-intensive processes that consume a significant amount of processing, memory, and energy resources, all of which may be scarce on mobile devices. In addition, these solutions are generally limited to evaluating the behavior of an individual application program or process and/or with respect to a single processor or core (herein collectively processing core), and do not provide an accurate or complete model of complex mobile device behaviors that may be distributed across multiple heterogeneous processing cores. For these and other reasons, existing modeling solutions are not suitable for use in mobile devices that include multiple heterogeneous processing cores.

Mobile devices are resource constrained systems that have relatively limited processing, memory, and energy resources. Modern mobile devices are also complex systems, and there are a large variety of factors that may contribute to the degradation in performance and power utilization levels of a mobile device over time, including poorly designed software applications, malware, viruses, fragmented memory, background processes, etc. Due to the number, variety, and complexity of these factors, it is often not feasible to evaluate all the factors that may contribute to the degradation in performance and/or power utilization levels of the complex yet resource-constrained systems of modern mobile devices.

The various aspects include multiprocessor mobile devices, systems, and methods for efficiently identifying, analyzing, classifying, modeling, preventing, and/or correcting the conditions and/or mobile device behaviors that often degrade a mobile device's performance and/or power utilization levels over time from a limited (coarse) set of behavior observations. By reducing the number of factors that are observed or monitored in each processing core, and by reducing the amount of information communicated between heterogeneous processing cores, the various aspects improve the efficiency and the performance and power consumption characteristics of the mobile device.

On a heterogeneous platform (e.g., SIP, SOC, multi-processor devices, etc.), a single software application may be broken down into several sub-tasks, each of which may be scheduled onto (or performed in) a different processing core. That is, different portions of a software application may perform operations (e.g., API calls) on different individual processing cores, and the application's behavior may be spread (or distributed) across the different heterogeneous processing cores. For this reason, it is often difficult/challenging to obtain a complete picture of an application's behavior across multiple heterogeneous processing cores without cumbersome or exhaustive communications or coordination between the processing cores. By generating a partial, incomplete, light-weight, or succinct behavior signature in each processing core to describe a portion of the application from the perspective of (or from within the context of) each individual processing core, and by efficiently communicating behavior information across/among/between multiple heterogeneous processing cores via the generated behavior signatures, the various aspects may identify, analyze and/or respond to mobile device behaviors and conditions that have a high potential to negatively impact the mobile device without consuming an excessive amount of the mobile device's battery or processing resources.

In both single and multi processor systems, processes or threads (herein collectively processes) that share, have access to, and/or operate within the same context may communicate via relatively fast memory read/write operations. On the other hand, communications between independent processes that do not share a context are often accomplished via relatively slow and expensive (e.g., in terms of performance costs, energy consumption, memory access times, etc.) function calls, method invocations, procedure calls, message exchanges, domain sockets, and other forms of inter-process communication (IPC). Remote procedure calls (RPC) and remote method invocations (RMI) are inter-process communications (IPCs) that allow a calling process to cause a subroutine, procedure, process, or service to execute in another address space, commonly on another processor, chip, or computing device.

On a heterogeneous platform, the memory and resources available to different processing cores are often in separate domains (e.g., protection domains, physical domains, etc.). In addition, each of the processing cores may be configured with a different operating system and/or implement different hardware description languages (HDL) or instruction set architectures (ISA). In such systems, RPC/RMI mechanisms may provide an interface that allows a calling process on a first processing core to cause an operation, service, or process to execute in a second processing core, and for the second processing core to send the results of the execution back to the first processing core. Often, to interpret the results, the first processing core requires access to information that is not readily available to the processes that do not share the same context as the operation, service, or process executed on the second processing core. In such situations, existing RPC/RMI solutions require that the second processing core include in the results all the context information (i.e., state information, permissions, etc.) that is to be used by the called service.

Communicating such large amounts of information (e.g., the results of a program, procedure, or service execution, etc.) between a first and second processing core via existing RPC/RMI mechanisms typically consumes an excessive amount of power, memory, and processing resources. In addition, the processing cores may have different operating systems and/or implement different hardware description languages, in which case the first processing core may be required to perform complex and power intensive operations to recreate the second processing core's context before it can interpret the execution results received from the second processing core. Recreating the context may also require modifications to the kernel or host operating system of the first processing core, which may require the execution of additional complex and power intensive operations and/or require significant modifications to the mobile device architecture. For these and other reasons, using standard RMI/RPC solutions to communicate behavior information between heterogeneous cores may degrade or reduce the performance and power consumption characteristics of a mobile device, and degrade the user experience.

When performing behavior observation and analysis operation on a heterogeneous platform, each processing core may be required to collect a large amount of behavior information, and send all the collected behavior information and context information to another processing core for analysis. However, communicating such large amounts of information between the processing cores is an inefficient use of mobile device resources, and may degrade or reduce the performance and power consumption characteristics of the mobile device.

Mobile devices are resource constrained systems that have relatively limited processing, memory and energy resources. Therefore, cumbersome or exhaustive approaches to (or methods of) coordinating the operations of the multiple processing cores in order to observe or monitor a software application or behavior are not well suited for use in mobile devices. For example, transferring API logs (e.g., via memory read/write operations) and context information from slave or secondary processing cores to a master or primary processing core (i.e., the main applications processor core or CPU) can result in prohibitive overheads, particularly for the battery-driven mobile devices.

For all of the forgoing reasons, existing solutions are not suitable for use in mobile devices that include multiple heterogeneous processing cores.

The various aspects overcome the limitations existing solutions by providing mobile devices having one or more secondary processing cores configured to observe a portion of a mobile device behavior and generate a behavior signature that identifies the most relevant features of the observed mobile device behavior from the perspective of the monitoring secondary processing core. Each secondary processing core may send the generated behavior signature to a primary processing core of the mobile device, which may intelligently combine the behavior signatures received from the secondary processing cores (e.g., via a task graph) and generate a global behavior vector that identifies a complete behavior of a distributed software application or a complete mobile device behavior. The mobile device may then use the generated behavior vector to identify, classify, model, prevent, and/or correct the conditions and behaviors that have a high potential to negatively impact the mobile device.

In an aspect, an master observer process, daemon, module, or sub-system (herein collectively referred to as a "module") of a primary processing core of the mobile device may instrument or coordinate various application programming interfaces (APIs) at various levels of the mobile device system and collect behavior information from the instrumented APIs. In an aspect, the master observer module may receive partial/incomplete behavior signatures generated in slave observer modules of secondary processing cores. Each partial/incomplete behavior signature may succinctly describe a portion of the overall behavior of the mobile device or software application observed (e.g., via the instrumented APIs) in the secondary processing core in a value or vector data-structure (e.g., in the form of a string of numbers, state machine, etc.). Each partial/incomplete behavior signature may also describe the overall behavior of the mobile device or software application from the perspective of, or from within the context of, a secondary processing core. For example, a partial/incomplete behavior signature may describe portions of a software application executed by a secondary processing core or which accessed memory or processing resources available to the secondary processing core.

The master observer module in the primary processing core may use a task graph to recombine the partial/incomplete behavior signatures received from the secondary processing cores to generate a behavior vector suitable for use in determining whether the overall behavior of the software application or mobile device is consistent with normal operating patterns of that mobile device. Each behavior vector may succinctly describe the overall behavior of the mobile device or a specific software application in a value or vector data-structure (e.g., in the form of a string of numbers, state machine, etc.).

The master observer module may send the generated behavior vector to an analyzer module (e.g., via a memory write operation, etc.) of the mobile device, which may generate spatial and/or temporal correlations based on information included in the behavior vector and/or information collected from various other mobile device sub-systems. The generated spatial and/or temporal correlations may be used by various modules (e.g., by an actuation module, etc.) of the mobile device to identify and/or respond to behaviors that are determined to have a high probability of negatively impacting the mobile device's performance or battery consumption levels.

In an aspect, the primary processing core of the mobile device may be on the same chip or substrate as the secondary processing cores. In an aspect, one or more of the secondary processing core may be on a different chip or substrate as the primary processing core. In an aspect, the master and secondary processing cores may each be configured with a different operating system and/or implement different hardware description languages or instruction set architectures. In various aspects, the primary and secondary processing cores may be in the same SIP, SOC, chip, substrate, circuit, or microprocessor.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108.

Each processor 101, 104, 106, 108, 110 may include one or more cores, and each processor/core may perform operations independent of the other processors/cores. For example, the SOC 100 may include a processor that executes a first type of operating system (e.g., FreeBSD, LINUX, OS X, etc.) and a processor that executes a second type of operating system (e.g., Microsoft Windows 8). In various aspects, each of the processors 101, 104, 106, 108, 110 may be a master or primary processing core, and each of the other processors 101, 104, 106, 108, 110 may be a non-master or secondary processing core.

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The resources/system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors/cores (e.g., DSP 101, modem processor 104, graphics processor 106, application processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, global positioning system (GPS) receivers, communications circuitry (e.g., Bluetooth®, WLAN, WiFi, etc.), and other well known components (e.g., accelerometer, etc.) of modern electronic devices.

In an aspect, the application processor 108 may be a master processing core, and the other processors 101, 104, 106, 110 may be non-master processing cores. In an aspect, the application processor 108 may be a master processor, and the other processors 101, 104, 106, 110 may be a plurality of non-master processing cores or a plurality of non-master processors of a mobile device. In an aspect, the master processor may be configured to monitor a distribution of sub-tasks of a single application to the plurality of non-master processors. In an aspect, each non-master processor may be configured to observe a portion of a mobile device behavior that is relevant to that non-master processor and generate a behavior signature based on the observations. In an aspect, the master processor may be configured to combine two or more behavior signatures received from two or more non-master processors in the master processor to generate a global behavior vector that describes an entire or complete mobile device behavior or application and which may be provided to an analyzer module for processing. In an aspect, the master processor may include means for processing the global behavior vector in an analyzer module to determine whether a software application is benign or not benign.

Figure 2:
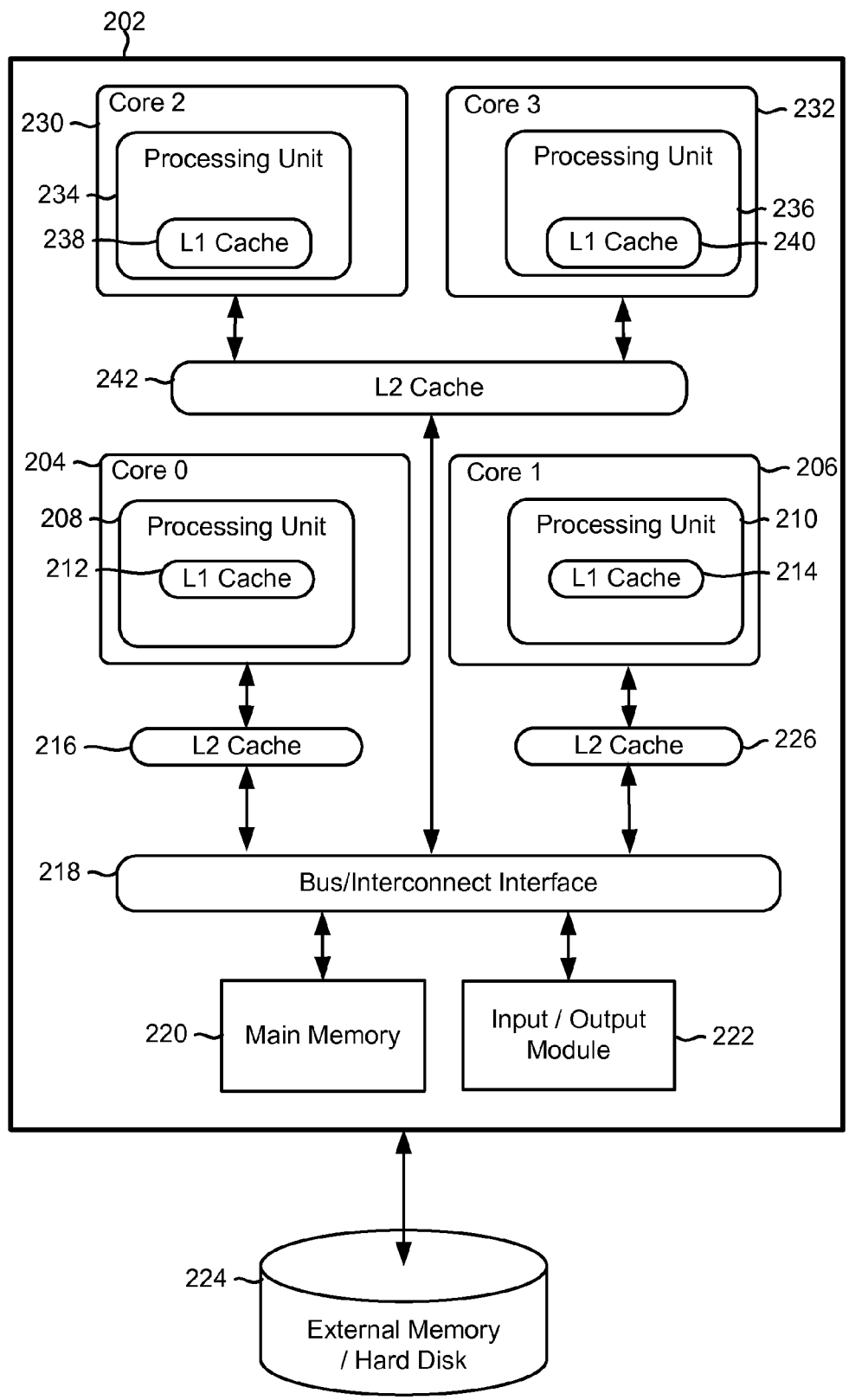
FIG. 2 is an architectural diagram of an example multicore processor suitable for implementing the various aspects.

In addition to the SOC 100 discussed above, the various aspects may be implemented in a wide variety of multiprocessor and multicore processor systems. FIG. 2 illustrates an example multicore processor architecture that may be used to implement the various aspects. The multicore processor 202 may include two or more independent processing cores 204, 206, 230, 232 in close proximity (e.g., on a single substrate, die, integrated chip, etc.). The proximity of the processing cores 204, 206, 230, 232 allows memory to operate at a much higher frequency/clock-rate than is possible if the signals have to travel off-chip. Moreover, the proximity of the processing cores 204, 206, 230, 232 allows for the sharing of on-chip memory and resources (e.g., voltage rail), as well as for more coordinated cooperation and synchronization between cores.

In various aspects, the processing cores 204, 206, 230, 232 may be identical to one another, be heterogeneous, and/or implement different specialized functions. Thus, processing cores 204, 206, 230, 232 need not be symmetric, either from the operating system perspective (e.g., may execute different operating systems) or from the hardware perspective (e.g., may implement different instruction sets/architectures). In addition, each processing core 204, 206, 230, 232 may have exclusive control over some resources and share other resources with the other cores.

The processing cores 204, 206, 230, 232 may communicate with each other via the bus/interconnect interface 218, direct memory read/write operations to a shared memory, function calls, method invocations, procedure calls, message exchanges, domain sockets (e.g., Unix-domain sockets), and other forms of inter-process communication (IPC).

In various aspects, the multicore processor 202 may be a master processing core (e.g., an application processor 108, CPU, etc.) or a non-master processing core. In an aspect, one processing core 204 may be a mater processing core and the other processing cores 206, 230, 232 may be non-master processing cores.

In the example illustrated in FIG. 2, the multicore processor 202 includes a multi-level cache, which includes a plurality of Level 1 (L1) caches 212, 214, 238, 240 and Level 2 (L2) caches 216, 226, 242. The multicore processor 202 also includes a bus/interconnect interface 218, a main memory 220, and an input/output module 222. The L2 caches 216, 226, 242 may be larger (and slower) than the L1 caches 212, 214, 238, 240, but smaller (and substantially faster) than a main memory 220 unit. Each processing core 204, 206, 230, 232 may include a processing unit 208, 210, 234, 236 that has private access to an L1 cache 212, 214, 238, 240. The processing cores 204, 206, 230, 232 may share access to an L2 cache (e.g., L2 cache 242) or may have access to an independent L2 cache (e.g., L2 cache 216, 226).

The L1 and L2 caches may be used to store data frequently accessed by the processing units, whereas the main memory 220 may be used to store larger files and data units being accessed by the processing cores 204, 206, 230, 232. The multicore processor 202 may be configured so that the processing cores 204, 206, 230, 232 seek data from memory in order, first querying the L1 cache, then L2 cache, and then the main memory if the information is not stored in the caches. If the information is not stored in the caches or the main memory 220, multicore processor 202 may seek information from an external memory and/or a hard disk memory 224.

Multiprocessor hardware designs, such as those discussed with reference to FIGS. 1 and 2, may include multiple processing cores of different capabilities inside the same package, often on the same piece of silicon. Symmetric multiprocessing hardware includes two or more identical processors connected to a single shared main memory that are controlled by a single operating system. Asymmetric or "loosely-coupled" multiprocessing hardware may include two or more heterogeneous processors/cores that may each be controlled by an independent operating system and connected to one or more shared memories/resources. The various aspects may include or make use of any combination of symmetric and asymmetric multiprocessing hardware systems.

Figure 3:
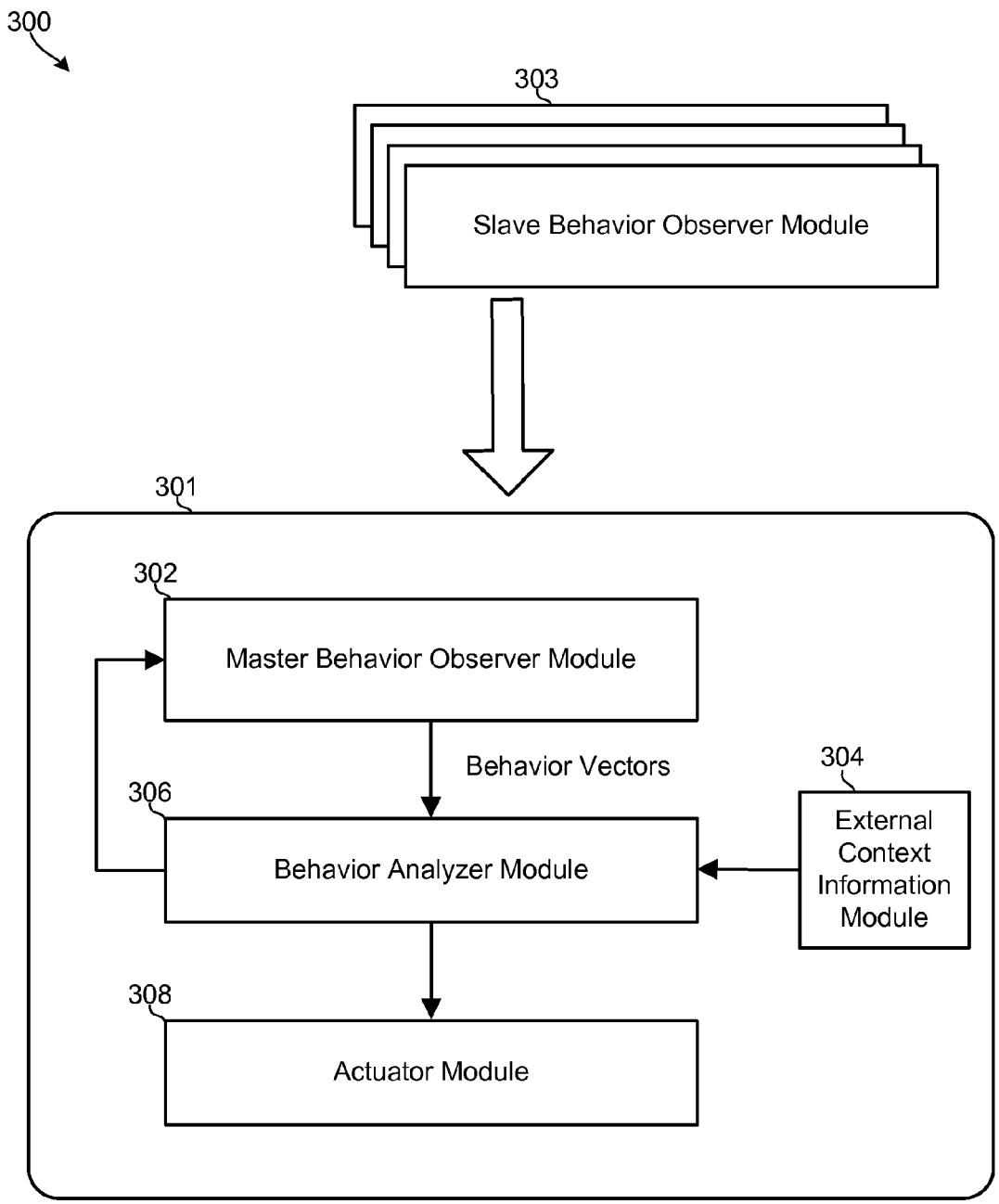
FIG. 3 is a block diagram illustrating example logical components and information flows in a computing system configured to perform dynamic and adaptive observations in a heterogeneous platform in accordance with the various aspects.

FIG. 3 illustrates example logical components and information flows in an aspect processing core 301 of a heterogeneous multiprocessor system 300 configured to identify, prevent, and/or correct the conditions and mobile device behaviors that have a high potential to contribute to the degradation in performance and power utilization levels of the mobile device over time. In an aspect, the processing core 301 may be a primary or master processing core.

In the example illustrated in FIG. 3, the processing core 301 includes a behavior observer module 302, a behavior analyzer module 306, an external context information module 304, and an actuator module 308. The processing core 301 may be configured to receive behavior signatures and other communications from one or more slave behavior observer modules 303.

Each of the modules 302-308 may be implemented in software, hardware, or any combination thereof. In various aspects, the modules 302-308 may be implemented within parts of the operating system (e.g., within the kernel, in the kernel space, in the user space, etc.), within separate programs or applications, in specialized hardware buffers or processors, or any combination thereof. In an aspect, one or more of the modules 302-308 may be implemented as software instructions executing on one or more processing cores of a mobile device.

Any of the behavior observer modules 302, 303 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, generate behavior signatures, store the generated observations and/or behavior signatures in a memory (e.g., in a log file, cache memory, etc.) and/or send (e.g., via memory writes, function calls, etc.) the generated signatures or observations to a master/primary processing core or to a behavior analyzer module 306.

By generating a partial, incomplete, light-weight, or succinct behavior signature in each processing core to describe a portion of the application from the perspective of (or from within the context of) each individual processing core, the behavior observer modules 302, 303 may generate behavior information from a reduced set of observations (and thus operations) that may be more readily combined with other observations/behavior information collected from other processing cores to identify, analyze and/or respond to a complete mobile device behavior or condition that has a high potential to negatively impact the mobile device. In addition, the behavior signatures allow the behavior information to be communicated across/among/between multiple heterogeneous processing cores efficiently and without negatively impacting the mobile device.

Any of the behavior observer modules 302, 303 may monitor/observe mobile device operations and events by collecting information pertaining to library application programming interface (API) calls in an application framework or run-time libraries, system call APIs, file-system and networking subsystem operations, device (including sensor devices) state changes, and other similar events. The behavior observer modules 302, 303 may also monitor file system activity, which may include searching for filenames, categories of file accesses (personal info or normal data files), creating or deleting files (e.g., type exe, zip, etc.), file read/write/seek operations, changing file permissions, etc.

The behavior observer modules 302, 303 may also monitor/observe data network activity, which may include types of connections, protocols, port numbers, server/client that the device is connected to, the number of connections, volume or frequency of communications, etc. The behavior observer modules 302, 303 may monitor phone network activity, which may include monitoring the type and number of calls or messages (e.g., SMS, etc.) sent out, received, or intercepted (e.g., the number of premium calls placed).

The behavior observer modules 302, 303 may also monitor/observe the system resource usage, which may include monitoring the number of forks, memory access operations, number of files open, etc. The behavior observer modules 302, 303 may monitor the state of the mobile device, which may include monitoring various factors, such as whether the display is on or off, whether the device is locked or unlocked, the amount of battery remaining, the state of the camera, etc. The behavior observer modules 302, 303 may also monitor inter-process communications (IPC) by, for example, monitoring intents to crucial services (browser, contracts provider, etc.), the degree of inter-process communications, pop-up windows, etc.

The behavior observer modules 302, 303 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer modules 302, 303 may also monitor/observe one or more hardware counters that denote the state or status of the mobile computing device and/or mobile device sub-systems. A hardware counter may include a special-purpose register of the processors/cores that is configured to store a count or state of hardware-related activities or events occurring in the mobile computing device.

The behavior observer modules 302, 303 may also monitor/observe actions or operations of software applications, software downloads from an application download server (e.g., Apple® App Store server), mobile device information used by software applications, call information, text messaging information (e.g., SendSMS, BlockSMS, ReadSMS, ect.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer modules 302, 303 may monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer modules 302, 303 may monitor/observe usage of and updates/changes to compass information, mobile device settings, battery life, gyroscope information, pressure sensors, magnet sensors, screen activity, etc. The behavior observer modules 302, 303 may monitor/observe notifications communicated to and from a software application (AppNotifications), application updates, etc. The behavior observer modules 302, 303 may monitor/observe conditions or events pertaining to a first software application requesting the downloading and/or install of a second software application. The behavior observer modules 302, 303 may monitor/observe conditions or events pertaining to user verification, such as the entry of a password, etc.

The behavior observer modules 302, 303 may monitor/observe conditions or events at multiple levels of the mobile device, including the application level, radio level, and sensor level.

Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle to vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user). Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

To reduce the number of factors monitored to a manageable level, in an aspect, the behavior observer modules 302, 303 may perform coarse observations by monitoring/observing an initial set of behaviors or factors that are a small subset of all factors that could contribute to the mobile device's degradation. In an aspect, the initial set of behaviors and/or subset of the factors may be selected by analysis of benign and problematic applications on mobile devices. In various aspects, the behavior observer module 302, 303 may receive the initial set of behaviors and/or factors from another processing core (e.g., master processing core, etc.), a network server, or a component in a cloud service provider network.

The behavior analyzer module 306 may receive behavior vectors from the behavior observer module 302 and compare them to one or more behavior modules to determine whether a particular mobile device behavior, software application, or process is performance-degrading/malicious, benign, or suspicious. The behavior analyzer module 306 may also compare the received information (i.e., observations) with contextual information received from the external context information module 304 to identify subsystems, processes, and/or applications that are contributing to (or are likely to contribute to) the device's degradation over time or which may otherwise cause problems on the mobile device.

In an aspect, the behavior analyzer module 306 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 306 may be configured to analyze information (e.g., in the form of observations) collected from the various processing cores and modules (e.g., the behavior observer module 302, external context information module 304, etc.), learn the normal operational behaviors of the mobile device, and generate or update one or more behavior vectors based the results of the comparisons. In an aspect, the behavior analyzer module 306 may send the generated behavior vectors to the actuator module 308, which may perform various actions or operations to correct mobile device behaviors determined to be malicious or performance-degrading and/or perform operations to heal, cure, isolate, or otherwise fix the identified problem.

In an aspect, if the behavior analyzer module 306 determines that a behavior, software application, or process is suspicious, the behavior analyzer module 306 may notify the behavior observer module 302, which may adjust the adjust the granularity of its observations (i.e., the level of detail at which mobile device behaviors are observed) and/or change the behaviors that are observed based on information received from the behavior analyzer module 306 (e.g., results of the real-time analysis operations), generate or collect new or additional behavior information, and send the new/additional information to the behavior analyzer module 306 for further analysis/classification. Such feedback communications between the behavior observer module 302 and the behavior analyzer module 306 enable the mobile device to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity.

Figure 4:
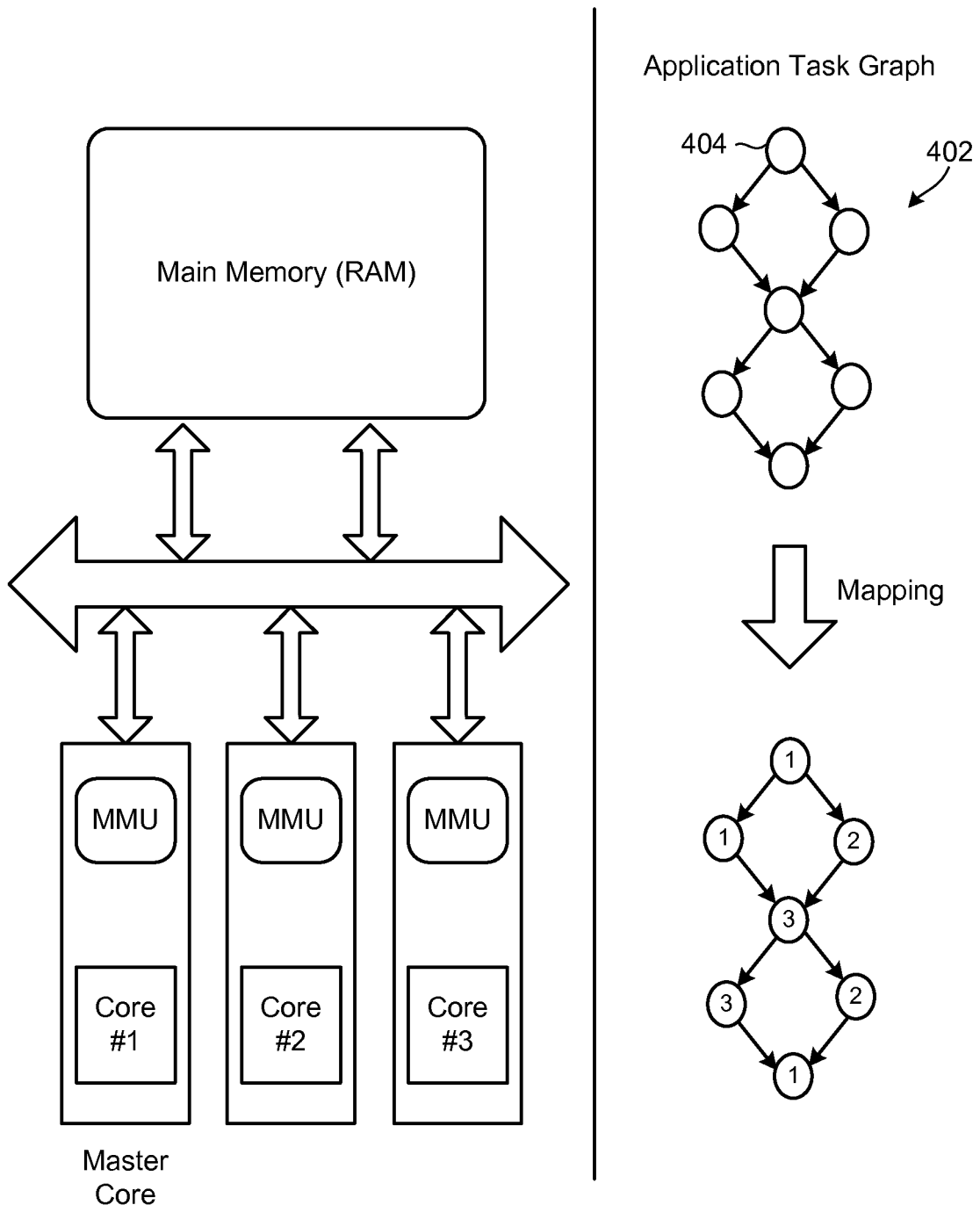
FIG. 4 is an illustration of an application task graph that characterizes the behavior of a software application distributed across multiple heterogeneous processing cores and is suitable for use in combining partial behavior signatures in accordance with various aspects.

FIG. 4 is an illustration of an application task graph that characterizes the complete behavior of a software application distributed across multiple heterogeneous processing cores and which is suitable for use in combining partial behavior signatures in accordance with various aspects. Generally, a task may be any module, execution block, logic, or unit of code that may be represented in an application task graph 402 and which identifies a complete or unified behavior of a software application. A task may include a plurality of sub-tasks 404, each of which may be a minimal execution block, module, logic, or unit of code within the task that is sufficiently independent of the other sub-tasks/execution blocks that it may be mapped onto, or moved to, a different processing core. For example, a subtask 404 may be a module that includes any number of (e.g., thousands of) operations or lines of code, and which is sufficiently independent and self-contained so that it may be shifted to another core. In an aspect, a subtask 404 may be any module, logic, or unit of code with clearly defined inputs and outputs and which may be moved, mapped, or shifted to another processing core.

On a heterogeneous platform, a software application may be broken down into several sub-tasks, each of which may be scheduled onto a different core. That is, different portions of a software application may perform operations (e.g., API calls) on different individual cores, and the application's behavior may be spread across the different cores. For this reason, it is often difficult/challenging to obtain a complete picture of an application's behavior across the multiple heterogeneous cores/processing units.

In an aspect, the mobile device may be configured to generate a task graph that characterizes the complete behavior of a software application distributed across multiple heterogeneous processing cores as a function of parameters, API calls, parameter values, and timestamps. In an aspect, the task graph may be used to obtain a complete picture of an application's behavior across the multiple heterogeneous processing cores.

Figure 5:
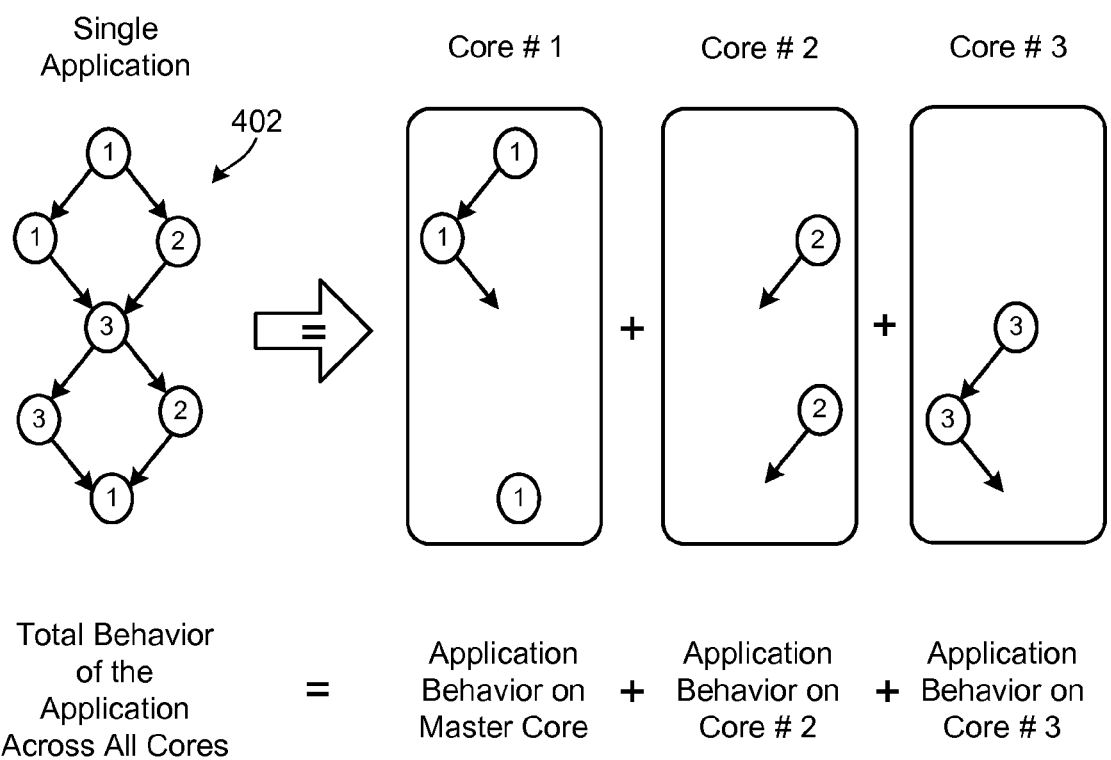
FIG. 5 is another illustration of an application task graph that characterizes the complete behavior of a software application distributed across multiple heterogeneous processing cores and which is suitable for use in combining partial behavior signatures in accordance with various aspects.

FIG. 5 is another illustration of an application task graph that characterizes the complete behavior of a software application distributed across multiple heterogeneous processing cores and which is suitable for use in combining partial behavior signatures in accordance with various aspects. Specifically, FIG. 5 illustrates that the application task graph 402, and thus the overall or complete behavior of a software application, may be equal to the sum of the subtasks included in each of the plurality of heterogeneous processing cores (Cores 1-3).

Due to the hardware, software, and/or architectural differences between the heterogeneous cores (Cores 1-3), communicating information between the cores may be prohibitively expensive, or may reduce the performance and power consumption of the mobile device. That is, mobile devices are resource constrained systems that have relatively limited processing, memory and energy resources. Therefore, cumbersome or exhaustive approaches to coordinating the operations of the multiple cores in order to observe or monitor a software application or behavior are not well suited for use in mobile devices. For example, transferring API logs from the various slave cores to a master core can result in prohibitive overheads, particularly for the battery-driven mobile devices. That is, it may be prohibitively expensive to transfer or send API logs generated in the secondary processing cores to the master core for analysis.

The various aspects may reduce or avoid cumbersome communications or exhaustive approaches to coordinating the operations of the multiple cores by generating behavior signatures in the secondary cores and communicating the behavior signatures (instead of API logs) the across cores. The master processing core may receive and combine the partial signatures in a meaningful fashion (i.e., via the task graph, based on time, using an action-sequence-number, etc.) to obtain the overall behavior of the software application.

Figure 6:
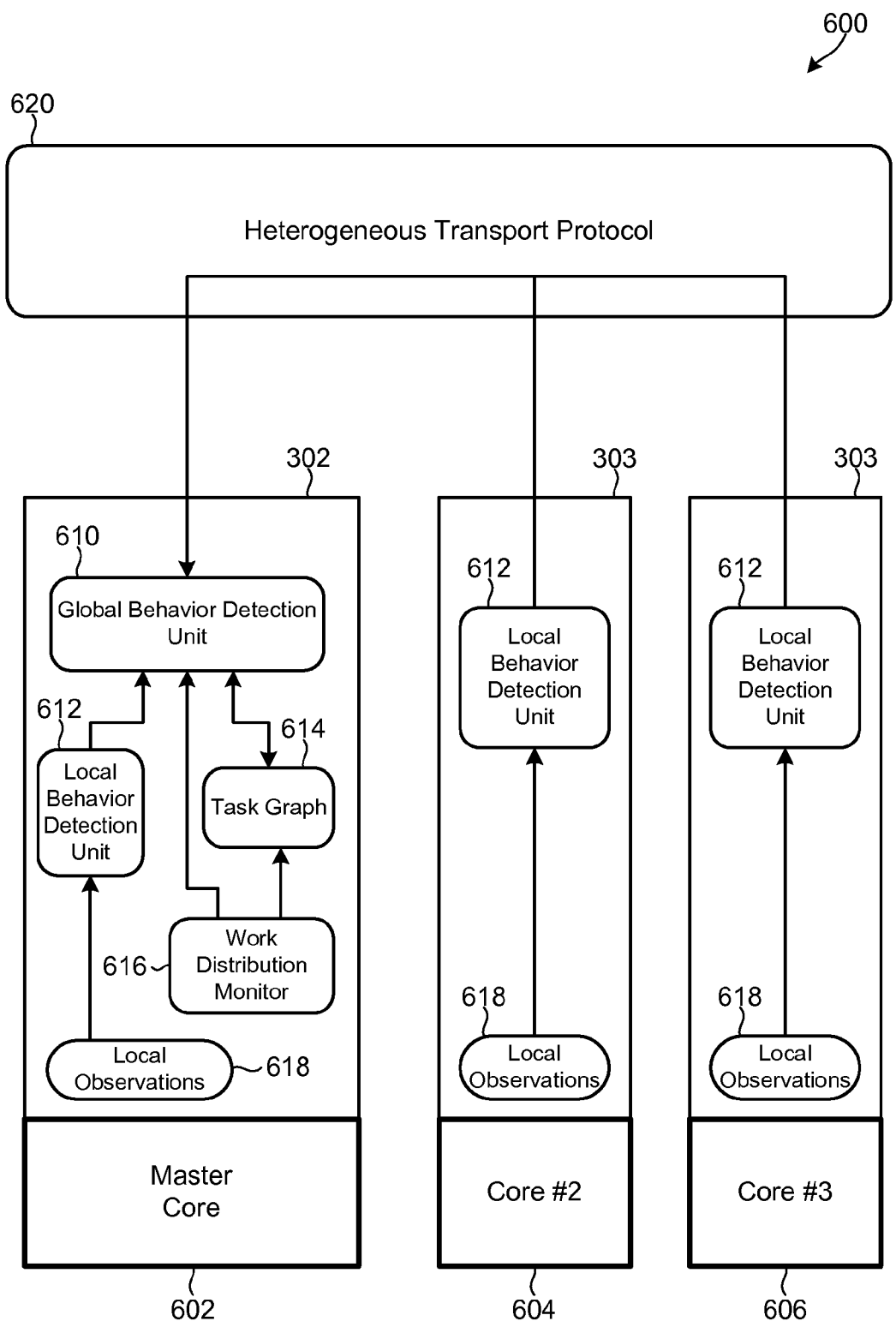
FIG. 6 is a block diagram illustrating example logical components and information flows in an aspect heterogeneous multiprocessor system having a master core and two secondary cores.

FIG. 6 illustrates example logical components and information flows in an aspect heterogeneous multiprocessor system 600 that includes a master core 602 and two secondary cores 604, 606. In various aspects, the secondary cores 604, 606 may be on the same or a different chip as the master processing core 602. Communications between the processing cores may be facilitated by a heterogonous transport protocol 620 module (e.g., a bus, IPC, network-on-chip, fabric, etc.).

In the example illustrated in FIG. 6, the master core 602 includes a master behavior observer module 302 that includes a global behavior detection unit 610 module, a local behavior detection unit 612 module, a task graph 614 module, a work distribution monitor 616 module, and a local observation 618 module. Each of the secondary cores 604, 606 may include a slave behavior observer module 303 that includes a local behavior detection unit 612 module and a local observation 618 module. The local behavior detection unit 612 modules may be configured to interpret local observations in their respective cores and provide a behavior signature to the global behavior detection unit 610 module for each software application being monitored.

Each slave behavior observer module 303 may monitor one or more activities (e.g., important APIs) in its respective secondary core 604, 606, generate a signature of the monitored activity that describes the behavior of the software application with respect to that particular core 604, 606 (and is thus a signature of a partial-behavior of the application). The behavior signature may be generated from behavior information collected by the slave behavior observer module 303 and succinctly describe portions of the mobile device behavior in a value or vector data-structure (e.g., in the form of a string of numbers, etc.). In an aspect, the behavior signature may function as an identifier and/or a certification that enables the master processing core to quickly recognize and identify a sub-task and its position in the application task graph 402 without performing any additional, cumbersome, or power intensive analysis or verification operations.

The slave behavior observer module 303 may send the generated signature to the master behavior observer module 302, which may use the application task graph 402 to combine the partial/incomplete behavior signatures to obtain/identify the complete behavior of the software application.

The work distribution monitor 616 may be configured to keep track of how the operations/work (i.e., sub-tasks) within a single application are being distributed to the various secondary cores 604, 606, which may be achieved by monitoring calls to the transport layer, the heterogonous transport protocol 620 module, or to the global behavior detection unit 610 module. The work distribution monitor 616 may also generate and maintain the application task graph 402 (i.e., a concurrent execution pattern) for use by the global behavior detection unit, which may use local behavior signatures received from the secondary cores 604, 606 in conjunction with the task graph 402 to generate a behavior vector that describes the overall behavior of the software application. This behavior vector may then be sent to the behavior analyzer module 306 and used to identify behaviors that have a high probability of negatively impacting the mobile device's performance or battery consumption levels.

Figure 7:
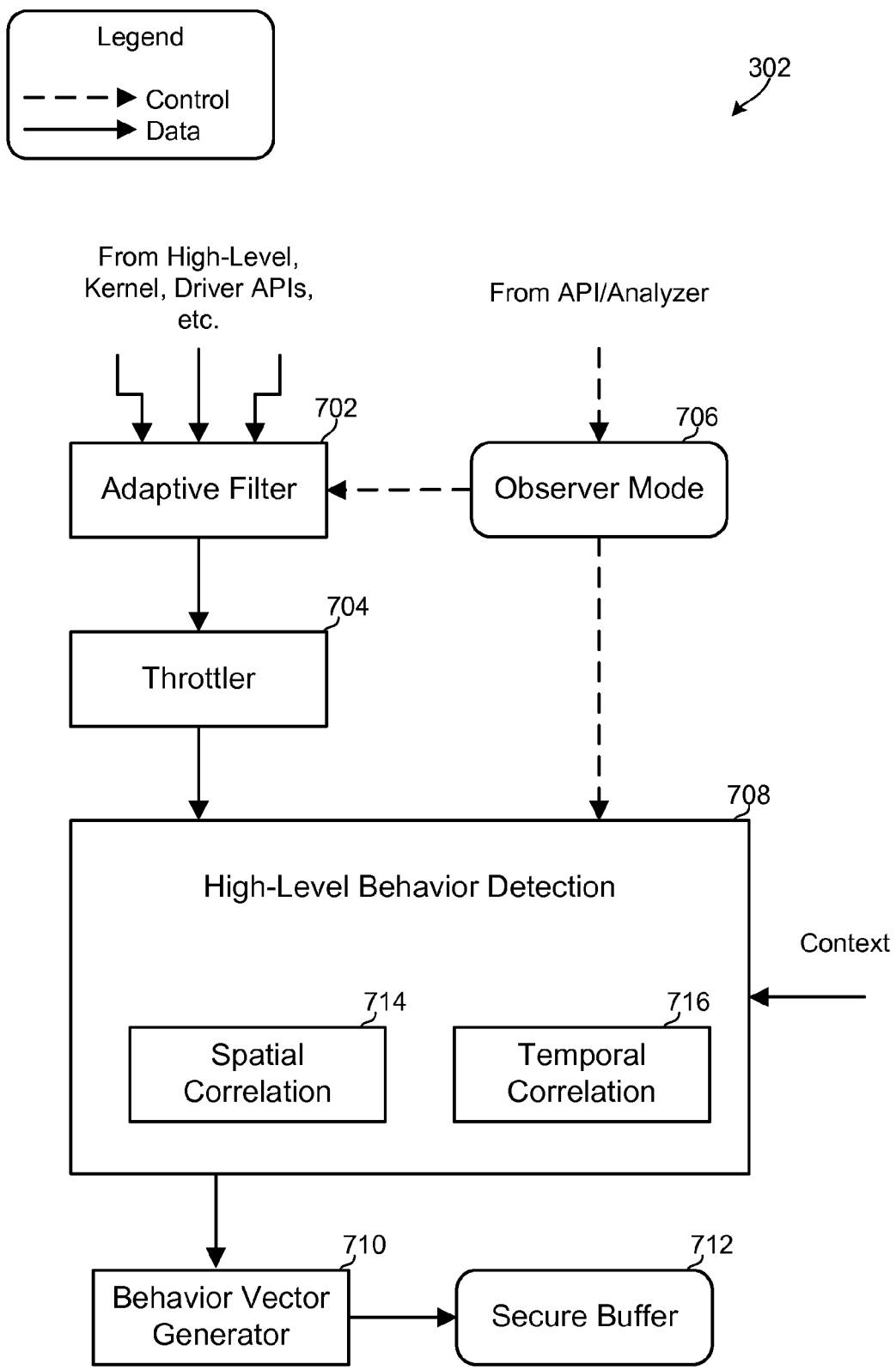
FIG. 7 is a block diagram illustrating example logical components and information flows in an observer module of a computing system configured to perform dynamic and adaptive observations in accordance with an aspect.

FIG. 7 illustrates example logical components and information flows in an behavior observer module 302 of a computing system configured to perform dynamic and adaptive observations in accordance with an aspect. The behavior observer module 302 may include an adaptive filter module 702, a throttle module 704, an observer mode module 706, a high-level behavior detection module 708, a behavior vector generator 710, and a secure buffer 712. The high-level behavior detection module 708 may include a spatial correlation module 714 and a temporal correlation module 716.

The observer mode module 706 may receive control information from various sources, which may include an analyzer unit (e.g., the behavior analyzer module 306 described above with reference to FIG. 3) and/or an application API. The observer mode module 706 may send control information pertaining to various observer modes to the adaptive filter module 702 and the high-level behavior detection module 708.

The adaptive filter module 702 may receive data/information from multiple sources, and intelligently filter the received information to generate a smaller subset of information selected from the received information. This filter may be adapted based on information or control received from the analyzer module, or a higher-level process communicating through an API. The filtered information may be sent to the throttle module 704, which may be responsible for controlling the amount of information flowing from the filter to ensure that the high-level behavior detection module 708 does not become flooded or overloaded with requests or information.

The high-level behavior detection module 708 may receive data/information from the throttle module 704, control information from the observer mode module 706, and context information from other components of the mobile device. The high-level behavior detection module 708 may use the received information to perform spatial and temporal correlations to detect or identify high level behaviors that may cause the device to perform at sub-optimal levels. The results of the spatial and temporal correlations may be sent to the behavior vector generator 710, which may receive the correlation information and generate a behavior vector that describes the behaviors of particular process, application, or sub-system. In an aspect, the behavior vector generator 710 may generate the behavior vector such that each high-level behavior of a particular process, application, or sub-system is an element of the behavior vector. In an aspect, the generated behavior vector may be stored in a secure buffer 712. Examples of high-level behavior detection may include detection of the existence of a particular event, the amount or frequency of another event, the relationship between multiple events, the order in which events occur, time differences between the occurrence of certain events, etc.

The behavior observer module 302 may perform adaptive observation techniques and control the observation granularity based on information received from a variety of sources. For example, the high-level behavior detection module 708 may receive information from the throttle module 704, the observer mode module 706, and context information received from other components (e.g., sensors) of the mobile device. As an example, a high-level behavior detection module 708 performing temporal correlations might detect that a camera has been used and that the mobile device is attempting to upload the picture to a server. The high-level behavior detection module 708 may also perform spatial correlations to determine whether an application on the mobile device took the picture while the device was holstered and attached to the user's belt. The high-level behavior detection module 708 may determine whether this detected high-level behavior (e.g., usage of the camera while holstered) is a behavior that is acceptable or common, which may be achieved by comparing the current behavior with past behaviors of the mobile device and/or accessing information collected from a plurality of devices (e.g., information received from a crowd-sourcing server). Since taking pictures and uploading them to a server while holstered is an unusual behavior (as may be determined from observed normal behaviors in the context of being holstered), in this situation the high-level behavior detection module 708 may recognize this as a potentially threatening behavior and initiate an appropriate response (e.g., shutting off the camera, sounding an alarm, etc.).

In an aspect, the behavior observer module 302 may be implemented in multiple parts.

Figure 8:
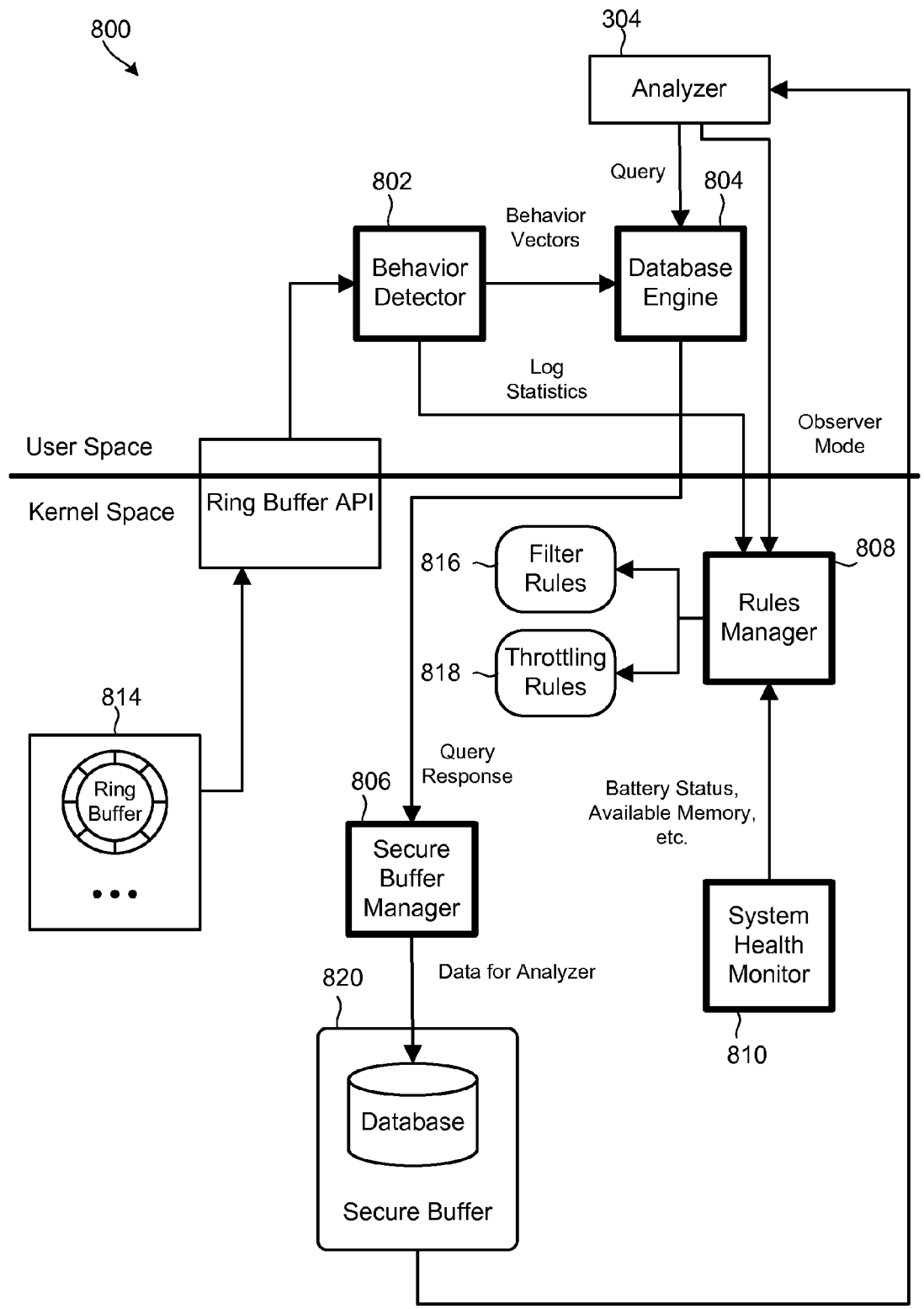
FIG. 8 is a block diagram illustrating logical components and information flows in a computing system implementing an aspect observer daemon.

FIG. 8 illustrates logical components and information flows in a computing system 800 implementing an aspect observer daemon. In the example illustrated in FIG. 8, the computing system 800 includes a behavior detector 802 module, a database engine 804 module, and a behavior analyzer module 306 in the user space, and a ring buffer 814, a filter rules 816 module, a throttling rules 818 module, and a secure buffer 820 in the kernel space. The computing system 800 may further include an observer daemon that includes the behavior detector 802 and the database engine 804 in the user space, and the secure buffer manager 806, the rules manager 808, and the system health monitor 810 in the kernel space.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 9:
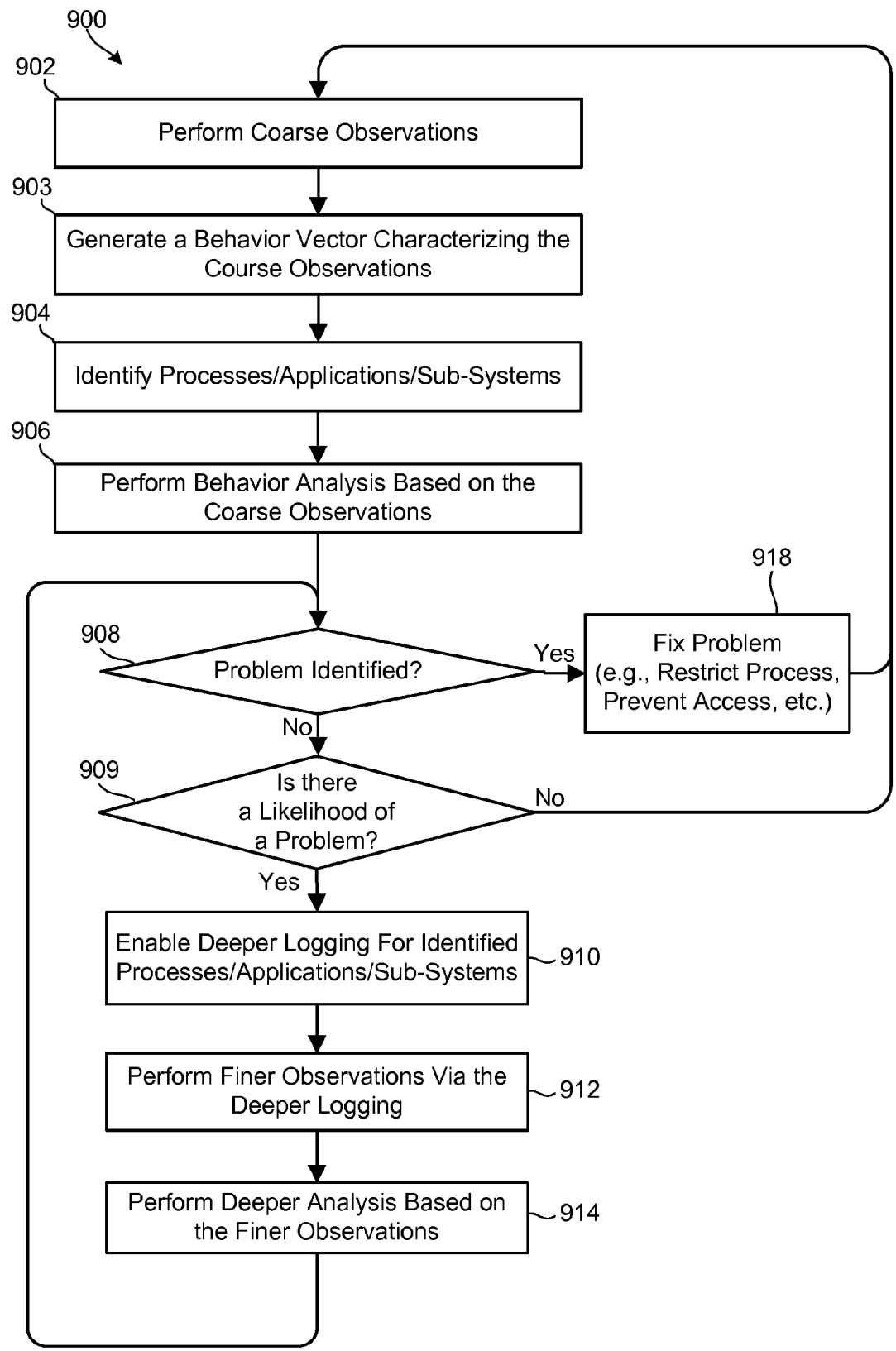
FIG. 9 is a process flow diagram illustrating an aspect method for performing adaptive observations on mobile devices.

FIG. 9 illustrates an example method 900 for performing dynamic and adaptive observations in accordance with an aspect. In block 902, the mobile device processor may perform coarse observations by monitoring/observing a subset of large number factors/behaviors that could contribute to the mobile device's degradation. In block 903, the mobile device processor may generate a behavior vector characterizing the coarse observations and/or the mobile device behavior based on the coarse observations. In block 904, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 906, the mobile device processor may perform behavioral analysis operations based on the coarse observations. In determination block 908, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 908="Yes"), in block 918, the processor may initiate a process to correct the behavior and return to block 902 to perform additional coarse observations.

When the mobile device processor determines that the suspicious behaviors or potential problems can not be identified and/or corrected based on the results of the behavioral analysis (i.e., determination block 908="No"), in determination block 909 the mobile device processor may determine whether there is a likelihood of a problem. In an embodiment, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 909="No"), the processor may return to block 902 to perform additional coarse observations.

When the mobile device processor determines that there is a likelihood that suspicious behaviors or potential problems exist and/or are detectable (i.e., determination block 909="Yes"), in block 910, the mobile device processor may perform deeper logging/observations or final logging on the identified subsystems, processes or applications. In block 912, the mobile device processor may perform deeper and more detailed observations on the identified subsystems, processes or applications. In block 914, the mobile device processor may perform further and/or deeper behavioral analysis based on the deeper and more detailed observations. In determination block 908, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 908="No"), the processor may repeat the operations in blocks 910-914 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 908="Yes"), in block 918, the mobile device processor may perform operations to correct the problem/behavior, and the processor may return to block 902 to perform additional operations.

In an aspect, as part of blocks 902-918 of method 900, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 10:
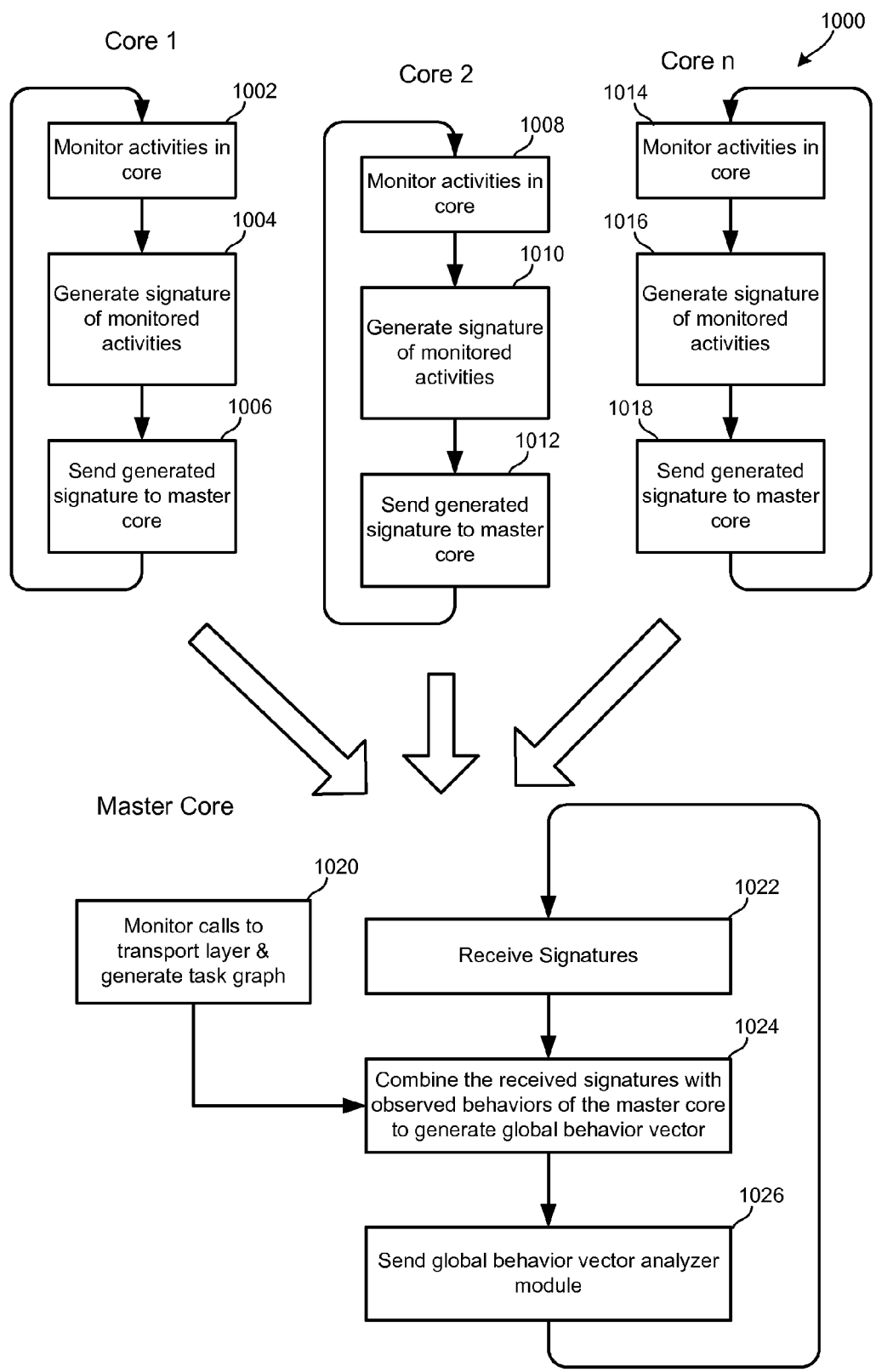
FIG. 10 is a process flow diagram illustrating aspect method for performing adaptive observations on mobile device having multiple heterogeneous processing cores.

FIG. 10 illustrates an example master observer method 1000 for performing observations on a mobile device processor in accordance with an aspect. In blocks 1002-1018, slave observer modules in each of the slave or secondary processing cores (Core 1, Core 2, Core n) may repeatedly monitor mobile device activities in their respective cores, generate a behavior signature based on the monitored activities, and send the generated signature to the master processing core (Master Core).

In block 1020, a master observer module of the master or primary processing core may monitor calls to the transport layer and generate a task graph. In block 1022, the master observer module may receive behavior signatures from the slave/secondary processing cores (Core 1, Core 2, Core n). In block 1024, the master observer module may combine the received behavior signatures with behavior information collected on the master core to generate a global behavior vector. In block 1026, the master observer module may send the generated global behavior vector to an analyzer module for further analysis.

Figure 11:
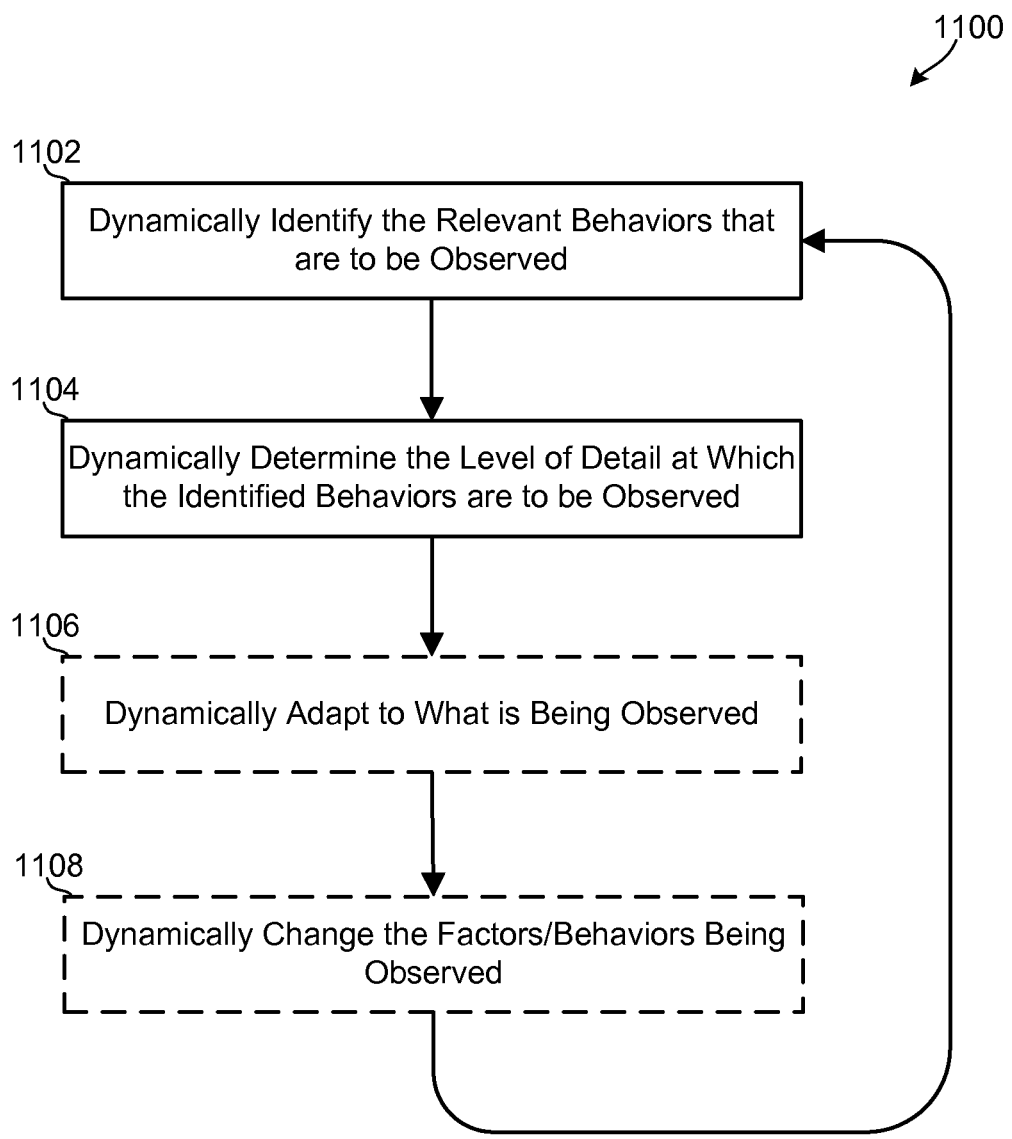
FIG. 11 is a process flow diagram illustrating another aspect method for performing adaptive observations on mobile devices.

FIG. 11 illustrates another example method 1100 for perform dynamic and adaptive observations by a mobile device processor in accordance with another aspect. In block 1102, the mobile device processor may dynamically identify the relevant behaviors that are to be observed on the mobile device. In block 1104, the mobile device processor may dynamically determine the level of detail at which the identified behaviors are to be observed. In optional block 1106, the mobile device processor may dynamically adapt to what is being observed. In optional block 1108, the mobile device processor may dynamically change or update the parameters, factors, behaviors, processes, applications, and/or subsystems that are to be observed. The operations of blocks 1102-1108 may be repeated continuously or as is necessary to improve the mobile device performance (e.g., battery power consumption, processing speed, network communication speeds, etc.).

Figure 12:
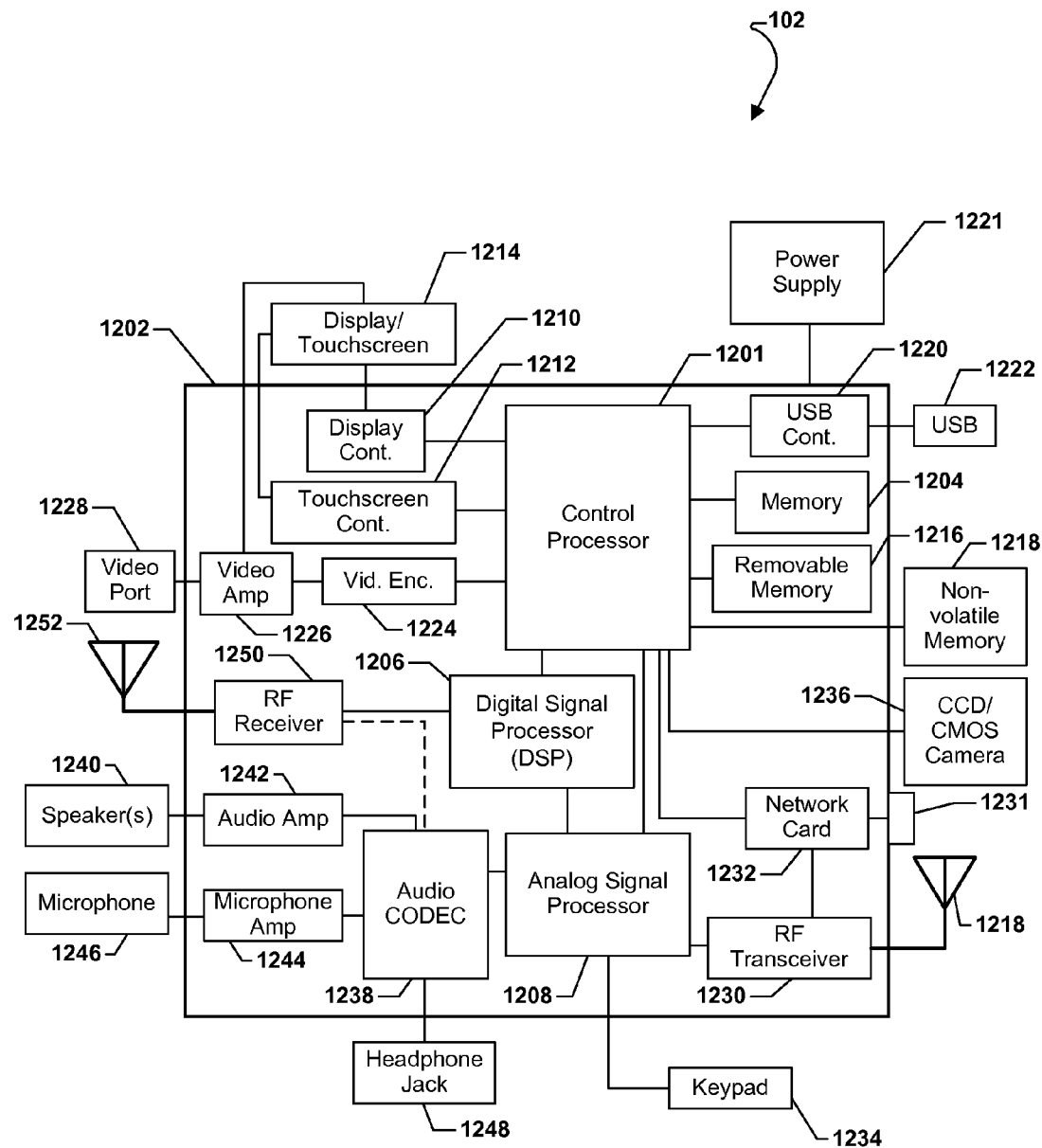
FIG. 12 is a component block diagram of mobile device suitable for use with the various aspects.

Example components and modules of an exemplary, non-limiting aspect of such a mobile device are illustrated in FIG. 12. A mobile computing device 102 may include a circuit board 1202 of electronic components, some or all of which may be integrated into an on-chip system, that includes a control processor 1201 coupled to memory 1204. The control processor 1201 may further be coupled to a digital signal processor 1206 and/or an analog signal processor 1208, which also be coupled together. In some embodiments, the control processor 1201 and a digital signal processor 1206 may be the same component or may be integrated into the same processor chip. A display controller 1210 and a touchscreen controller 1212 may be coupled to the control processor 1201 and to a display/touchscreen 1214 within or connected to the mobile computing device 102.

The control processor 1201 may also be coupled to removable memory 1216 (e.g., an SD memory or SIM card in the case of mobile computing devices) and/or to external memory 1218, such as one or more of a disk drive, CD drive, and a DVD drive. The control processor 1201 may also be coupled to a Universal Serial Bus (USB) controller 1220 which couples to a USB port 1222. In various aspects, a power supply 1221 may be coupled to the circuit board 1202 through the USB controller 1220 or through different electrical connections to provide power (e.g., DC power) to the various electronic components.

The control processor 1201 may also be coupled to a video encoder 1224, e.g., a phase alternating line (PAL) encoder, a sequential couleur a memoire (SECAM) encoder, or a national television system(s) committee (NTSC) encoder. Further, the video encoder 1224 may be coupled to a video amplifier 1226 which may be coupled to the video encoder 1224 and the display/touchscreen 1214. Also, a video port 1228 may be coupled to the video amplifier 1226 to enable connecting the mobile computing device 102 to an external monitor, television or other display (not shown).

The control processor 1201 may be coupled to a radio frequency (RF) transceiver 1230, such as via an analog signal processor 1208. The RF transceiver 1230 may be coupled to an RF antenna 1218 for transmitting and receiving RF signals. The RF transceiver 1230 may be configured to transmit and receive communication signals of one or more different wireless communication protocols including, for example, cellular telephone (e.g., G-3, UMTS, CDMA, etc.), WiFi, WiMax, and Bluetooth.

The control processor 1201 may further be coupled to a network card 1232 which may be coupled to a network connector 1231 and/or the RF transceiver 1230 and configured to enable communications via an external network (e.g., local area networks, the Internet, an intranet, WiFi networks, Bluetooth networks, personal area network (PAN) etc.) The network card 1232 may be in the form of a separate chip or card, or may be implemented as part of the control processor 1201 or the RF transceiver 1230 (or both) as a full solution communication chip.

A number of analog devices may be coupled to the control processor 1201 via the analog signal processor 1208, such as a keypad 1234. In other implementations, a keypad or keyboard may include its own processor so that the interface with the control processor 1201 may be via direct connection (not shown), via a network connection (e.g., via the network card), or via the USB port 1222.

In some implementations, a digital camera 1236 may be coupled to the control processor 1201. In an exemplary aspect, the digital camera 1236 may be a charge-coupled device (CCD) camera or a complementary metal-oxide semiconductor (CMOS) camera. The digital camera 1236 may be built into the mobile computing device 102 or coupled to the device by an external cable.

In some implementations, an audio CODEC 1238 (e.g., a stereo CODEC) may be coupled to the analog signal processor 1208 and configured to send sound signals to one or more speakers 1240 via an audio amplifier 1242. The audio CODEC 1238 may also be coupled to a microphone amplifier 1244 which may be coupled to a microphone 1246 (e.g., via a microphone jack). A headphone jack 1248 may also be coupled to the audio CODEC 1238 for outputting audio to headphones.

In some implementations, the mobile computing device 102 may include a separate RF receiver circuit 1250 which may be coupled to an antenna 1252 for receiving broadcast wireless communication signals. The receiver circuit 1250 may be configured to receive broadcast television signals (e.g., EBMS broadcasts), and provide received signals to the DSP 1206 for processing. In some implementations, the receiver circuit 1250 may be configured to receive FM radio signals, in which case the received signals may be passed to the Audio CODEC 1238 for processing.

In an aspect, processor-executable instructions for accomplishing one or more of the method operations described above may be stored in the internal memory 1204, removable memory 1216 and/or non-volatile memory 1218 (e.g., as on a hard drive, CD drive, or other storage accessible via a network). Such processor-executable instructions may be executed by the control processor 1201 in order to perform the methods described herein.

Figure 13:
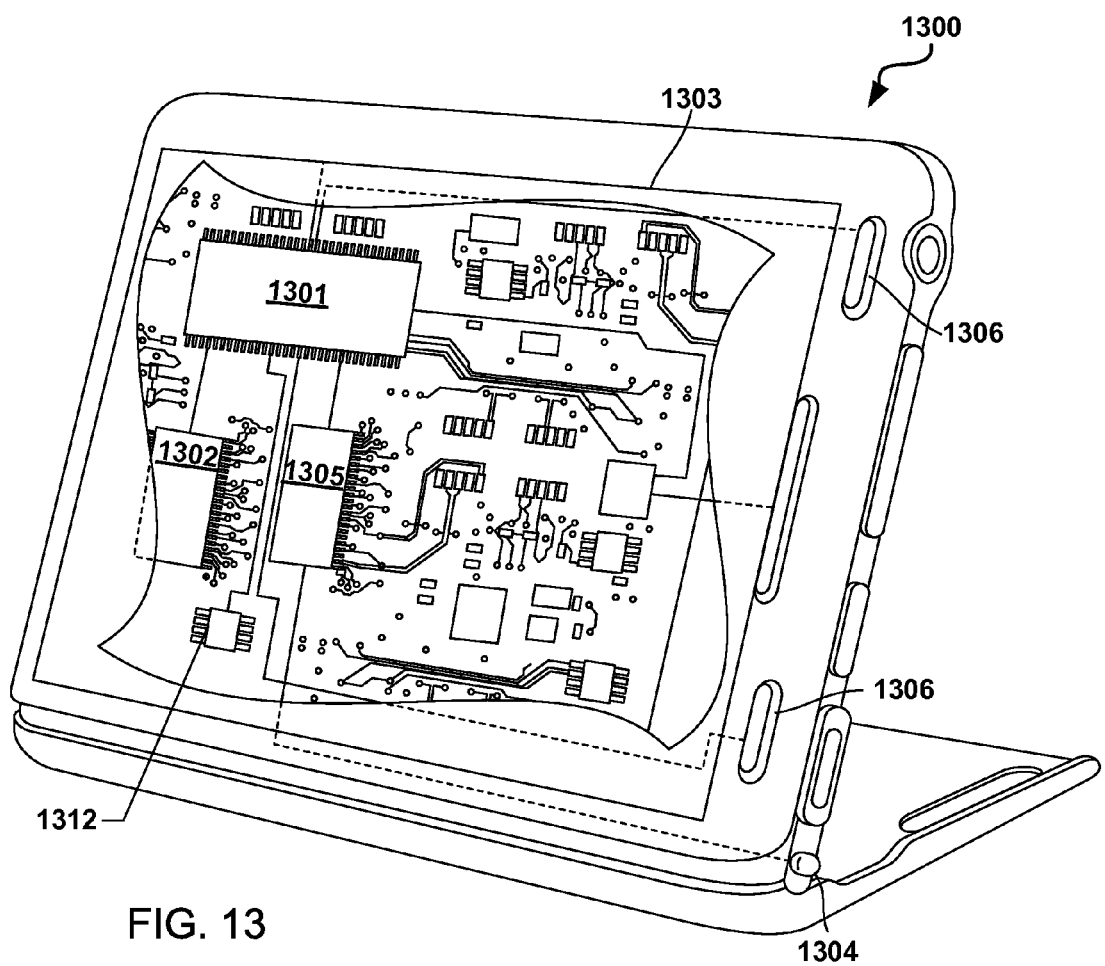
FIG. 13 is an illustration of an example mobile device suitable for use with the various aspects.

The various aspects may be implemented on a variety of mobile computing devices, an example of which is illustrated in FIG. 13 in the form of a smartphone. A smartphone 1300 may include a processor 1301 coupled to internal memory 1302, a display 1303, and to a speaker. Additionally, the smartphone 1300 may include an antenna 1304 for sending and receiving electromagnetic radiation that may be connected to a wireless data link and/or cellular telephone transceiver 1305 coupled to the processor 1301. Smartphone 1300 typically also include menu selection buttons or rocker switches 1306 for receiving user inputs.

A typical smartphone 1300 also includes a sound encoding/decoding (CODEC) circuit 1312, which digitizes sound received from a microphone into data packets suitable for wireless transmission and decodes received sound data packets to generate analog signals that are provided to the speaker to generate sound. Also, one or more of the processor 1301, wireless transceiver 1305 and CODEC 1312 may include a digital signal processor (DSP) circuit (not shown separately).

Figure 14:
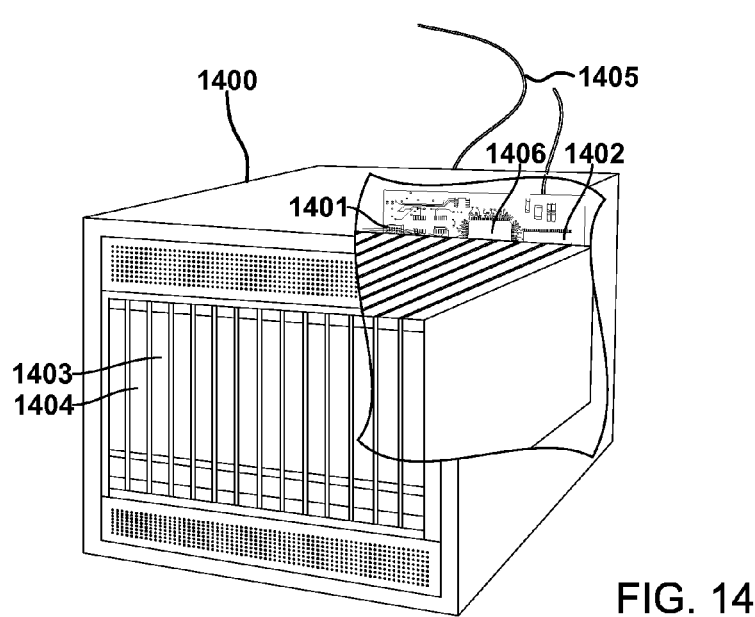
FIG. 14 is an illustration of an example server computer suitable for use with the various aspects.

Portions of the aspect methods may be accomplished in a client-server architecture with some of the processing occurring in a server, such as maintaining databases of normal operational behaviors, which may be accessed by a mobile device processor while executing the aspect methods. Such aspects may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1411 coupled to the processor 1401. The server 1400 may also include network access ports 1404 coupled to the processor 1401 for establishing data connections with a network 1405, such as a local area network coupled to other broadcast system computers and servers.

The processors 1301, 1401 may be any programmable microprocessor, microcomputer or multiple processor chip or chips that can be configured by software instructions (applications) to perform a variety of functions, including the functions of the various aspects described below. In some mobile devices, multiple processors 1301 may be provided, such as one processor dedicated to wireless communication functions and one processor dedicated to running other applications. Typically, software applications may be stored in the internal memory 1302, 1402, 1403 before they are accessed and loaded into the processor 1301, 1401. The processor 1301, 1401 may include internal memory sufficient to store the application software instructions.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

As used in this application, the terms "component," "module," "system," "service," "engine," "listener," "manager," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core, and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer readable storage medium, non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of monitoring behaviors of a computing device that includes heterogeneous processing cores, comprising:
    repeatedly monitoring in a non-master processing core of the computing device activities of a software application to collect behavior information on a partial behavior of the software application;
    using the collected behavior information to generate in the non-master processing core a behavior signature that describes the partial behavior of the software application in a vector data-structure;
    generating a task graph in a master processing core of the computing device; and
    generating a global behavior vector data-structure that describes a complete behavior of the software application in the master processing core by using the generated task graph to combine two or more behavior signatures generated in non-master processing cores that each describe a partial behavior of the software application in a vector data-structure.

2. The method of claim 1, further comprising:
    determining whether the software application is not benign based on the global behavior vector.

3. The method of claim 1, further comprising:
    monitoring in the master processing core a distribution of sub-tasks of the software application to a plurality of non-master processing cores of the computing device.

4. The method of claim 3, wherein monitoring the distribution of sub-tasks comprises monitoring calls to a transport layer of the computing device.

5. A computing device, comprising:
    a master processor; and
    one or more non-master processors coupled to the master processor,
    wherein each of the one or more non-master processors are configured with processor-executable instructions to perform operations comprising:
        repeatedly monitoring activities of a software application to collect behavior information on a partial behavior of the software application; and
        using the collected behavior information to generate a behavior signature that describes the observed partial behavior of the software application in a vector data-structure, and
    wherein the master processor is configured with processor-executable instructions to perform operations comprising:
        generating a task graph; and
        generating a global behavior vector data-structure that describes a complete behavior of the software application by using the generated task graph to combine two or more behavior signatures generated in non-master processing cores that each describe a partial behavior of the software application in a vector data-structure.

6. The computing device of claim 5, wherein the master processor is configured with processor-executable instructions to perform operations further comprising:
    determining whether the software application is not benign based on the global behavior vector.

7. The computing device of claim 5, wherein the master processor is configured with
    processor-executable instructions to perform operations further comprising: monitoring a distribution of sub-tasks of the software application to the one or more non-master processors.

8. The computing device of claim 7, wherein the master processor is configured with processor-executable instructions to perform operations such that monitoring the distribution of sub-tasks comprises monitoring calls to a transport layer of the computing device.

9. A computing device having multiple heterogeneous processing cores, comprising:
    means for repeatedly monitoring in a non-master processing core of the computing device activities of a software application to collect behavior information on a partial behavior of the software application;
    means for using the collected behavior information to generate in the non-master processing core a behavior signature that describes the observed partial behavior of the software application in a vector data-structure;
    means for generating a task graph in a master processing core of the computing device; and
    means for generating a global behavior vector data-structure that describes a complete behavior of the software application in the master processing core by using the generated task graph to combine two or more behavior signatures generated in non-master processing cores that each describe a partial behavior of the software application in a vector data-structure.

10. The computing device of claim 9, further comprising:
    means for determining whether the software application is not benign based on the global behavior vector.

11. The computing device of claim 9, further comprising:
    means for monitoring in the master processing core a distribution of sub-tasks of the software application to one or more non-master processing cores.

12. The computing device of claim 11, wherein means for monitoring the distribution of sub-tasks comprises means for monitoring calls to a transport layer of the computing device.

13. A non-transitory processor readable storage medium having stored thereon processor-executable software instructions configured to cause a computing device to perform operations comprising:

repeatedly monitoring in a non-master processor of the computing device activities of a software application to collect behavior information on a partial behavior of the software application;

using the collected behavior information to generate in the non-master processor a behavior signature that describes the observed partial behavior of the software application in a vector data-structure;

generating a task graph in a master processing core of the computing device; and generating a global behavior vector data-structure that describes a complete behavior of the software application in the master processing core by using the generated task graph to combine two or more behavior signatures generated in non-master processing cores that each describe a partial behavior of the software application in a vector data-structure.

14. The non-transitory processor readable storage medium of claim 13, wherein the stored processor-executable software instructions are configured to cause the computing device to perform operations further comprising:

determining whether the software application is not benign based on the global behavior vector.

15. The non-transitory processor readable storage medium of claim 13, wherein the stored processor-executable software instructions are configured to cause the computing device to perform operations further comprising:

monitoring in the master processor a distribution of sub-tasks of the software application to one or more non-master processors.

16. The non-transitory processor readable storage medium of claim 15, wherein the stored processor-executable software instructions are configured to cause the computing device to perform operations such that monitoring the distribution of sub-tasks comprises monitoring calls to a transport layer of the computing device.

\* \* \* \* \*